(12) United States Patent
Lin

(10) Patent No.: US 7,277,236 B1
(45) Date of Patent: Oct. 2, 2007

(54) ZOOM LENS AND IMAGE ACQUISITION APPARATUS INCORPORATING THE SAME

(75) Inventor: Ming-Kuen Lin, Taisi Township, Yunlin County (TW)

(73) Assignee: BenQ Corporation, Taoyuan Shien (TW)

( * ) Notice: Subject to any disclaimer, the term of this patent is extended or adjusted under 35 U.S.C. 154(b) by 0 days.

(21) Appl. No.: 11/650,997

(22) Filed: Jan. 9, 2007

(30) Foreign Application Priority Data

Feb. 24, 2006 (TW) .............................. 95106433 A

(51) Int. Cl.
*G02B 15/14* (2006.01)

(52) U.S. Cl. ...................... 359/689; 359/683; 359/676

(58) Field of Classification Search ................ 359/676, 359/683, 689, 659, 714, 770
See application file for complete search history.

(56) References Cited

U.S. PATENT DOCUMENTS

| 6,710,934 B2 * | 3/2004 | Park ............................ 359/689 |
| 6,853,498 B2 * | 2/2005 | Kim et al. ................... 359/689 |
| 7,106,522 B2 * | 9/2006 | Park ............................ 359/689 |

* cited by examiner

*Primary Examiner*—Hung Dang
*Assistant Examiner*—Jack Dinh
(74) *Attorney, Agent, or Firm*—Rabin & Berdo, PC

(57) ABSTRACT

A zoom lens having an effective focal length fw for the wide angle mode comprises a first lens group, a second lens group and a third lens group. The first lens group has a negative effective power and an effective focal length f1, wherein $2.1<|f1/fw|<2.6$. The first lens group comprises a first lens and a second lens. The first lens has a first negative power and at least a first concave aspheric lens surface. The second lens has a first positive power. The second lens group has a first positive effective power and an effective focal length f2, wherein $1.5<|f2/fw|<1.8$. The second lens group comprises a third lens and a fourth lens. The third lens has a second positive power and at least a second aspheric lens surface. The fourth lens has a third positive power. The third lens group has a second positive effective power.

22 Claims, 25 Drawing Sheets

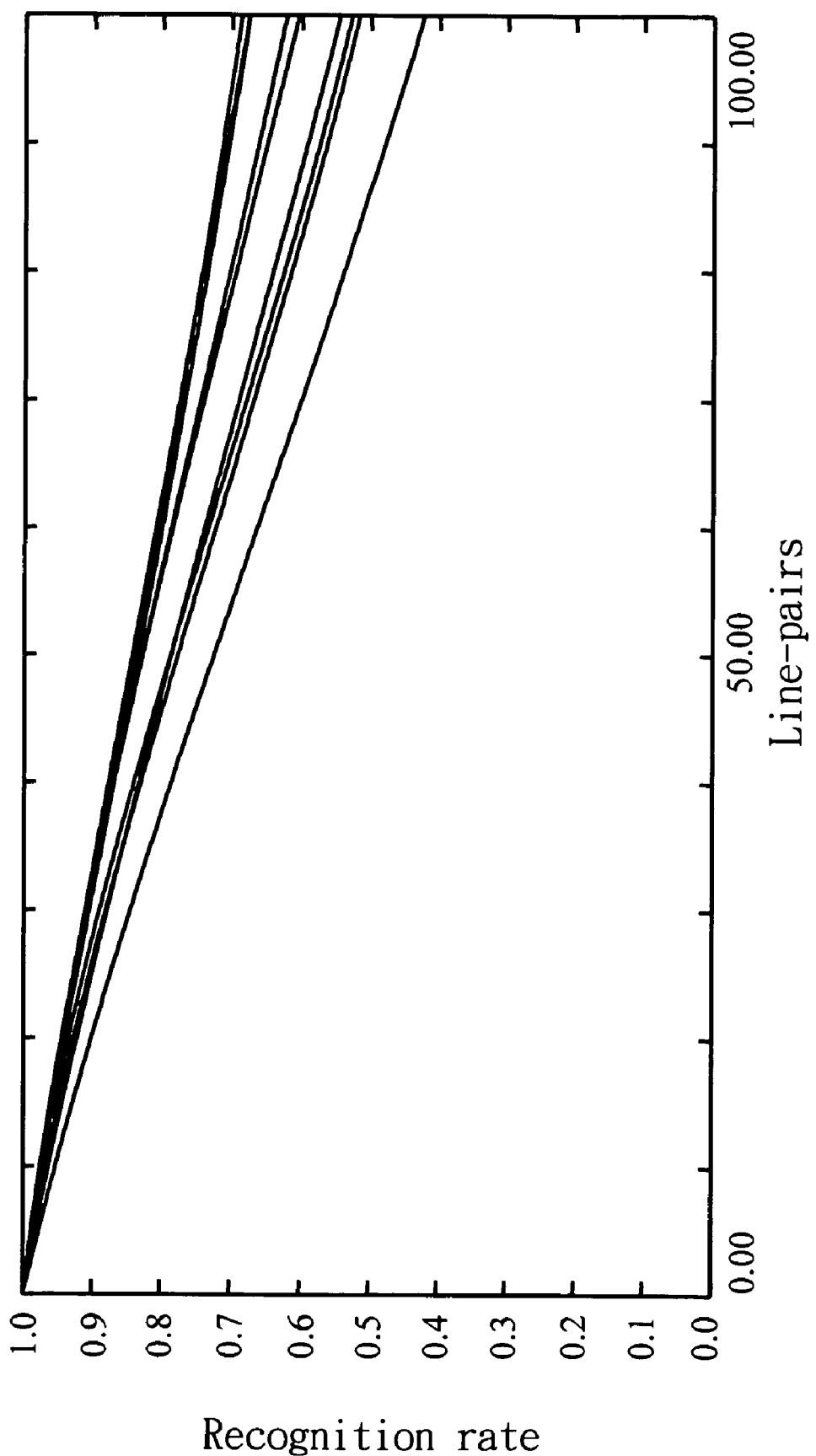

Wide angle mode

Wide angle mode

Wide angle mode

Wide angle mode

Wide angle mode

Telephoto mode

Telephoto mode

Telephoto mode

Telephoto mode

Telephoto mode

Wide angle mode

Telephoto mode

Telephoto mode

ZOOM LENS AND IMAGE ACQUISITION APPARATUS INCORPORATING THE SAME

This application claims the benefit of Taiwan application Serial No. 95106433, filed Feb. 24, 2006, the subject matter of which is incorporated herein by reference.

BACKGROUND OF THE INVENTION

1. Field of the Invention

The invention relates in general to a zoom lens and an image acquisition apparatus incorporating the same, and more particularly to a zoom lens having less than 6 lenses and short back focal length and an image acquisition apparatus incorporating the same.

2. Description of the Related Art

Conventionally, the zoom lens applied in a camera adopts the structure of having three lens groups. However, with the advance in technology and the demand in the market, the design of camera is directed towards slimness, compactness and lightweight. And it is crucial to shorten the back focal length (BFL) of the zoom lens and reduce the number of lens used in the three lens groups.

Besides, the zoom ratio, that is, the ratio of the effective focal length for the telephoto mode to the effective focal length for the wide angle mode, is a significant criterion in assessing the performance of image acquisition. Currently, the digital still camera at least has a zoom ratio of 3.

However, in order to achieve a preferred imaging effect, normally the digital still camera may use up to 10 lenses for the three lens groups, not only causing more restrictions to the structure but also incurring more costs. Therefore, how to reduce the size of the acquisition apparatus and yet maintain the image acquisition ability of the acquisition apparatus and the image quality has become an imminent challenge to the industry. The attempts including using the characteristics of the lenses of the three lens groups, such as the effective focal length, the power and the disposition of the lenses, or replacing multiple spherical lenses by an aspheric lens have been made.

SUMMARY OF THE INVENTION

It is therefore an object of the invention to provide a zoom lens and an image acquisition apparatus incorporating the same capable of largely reducing the number of lens used in the zoom lens to be less than 6 and achieving the zoom ratio of 3 at the same time. The zoom lens of the invention has an appropriate back focal length and is capable of tightly incorporating with other elements of the image acquisition apparatus.

The invention achieves the above-identified object by providing a zoom lens having an effective focal length fw for the wide angle mode. The zoom lens sequentially comprises a first lens group, a second lens group and a third lens group from an image side. The first lens group has a negative effective power and an effective focal length f1, wherein $2.1 < |f1/fw| < 2.6$. The first lens group comprises a first lens and a second lens. The first lens has a first negative power and at least a first concave aspheric lens surface. The second lens has a first positive power. The second lens group has a first positive effective power and an effective focal length f2, wherein $1.5 < |f2/fw| < 1.8$. The second lens group comprises a third lens and a fourth lens. The third lens has a second positive power and at least a second aspheric lens surface. The fourth lens has a third positive power. The third lens group has a second positive effective power.

The invention further achieves the above-identified object by providing an image acquisition apparatus. The image acquisition apparatus comprises a sensing element and a zoom lens. The zoom lens having an effective focal length fw for the wide angle mode comprises a first lens group, a second lens group and a third lens group. The first lens group has a negative effective power and an effective focal length f1, wherein $2.1 < |f1/fw| < 2.6$. The first lens group comprises a first lens and a second lens. The first lens has a first negative power and at least a first concave aspheric lens surface. The second lens has a first positive power. The second lens group disposed between the first lens group and the sensing element having a first positive effective power and an effective focal length f2, wherein $1.5 < |f2/fw| < 1.8$. The second lens group comprises a third lens and a fourth lens. The third lens has a second positive power and at least a second aspheric lens surface. The fourth lens has a third positive power. The third lens group disposed between the second lens group and the sensing element having a second positive effective power.

Other objects, features, and advantages of the invention will become apparent from the following detailed description of the preferred but non-limiting embodiments. The following description is made with reference to the accompanying drawings.

BRIEF DESCRIPTION OF THE DRAWINGS

FIGS. 5A and 5B are diagrams showing the relationship between recognition rate and line-pairs when the zoom lens according to a preferred embodiment of the invention is at the wide angle mode and the telephoto mode respectively;

DETAILED DESCRIPTION OF THE INVENTION

Figure 1:
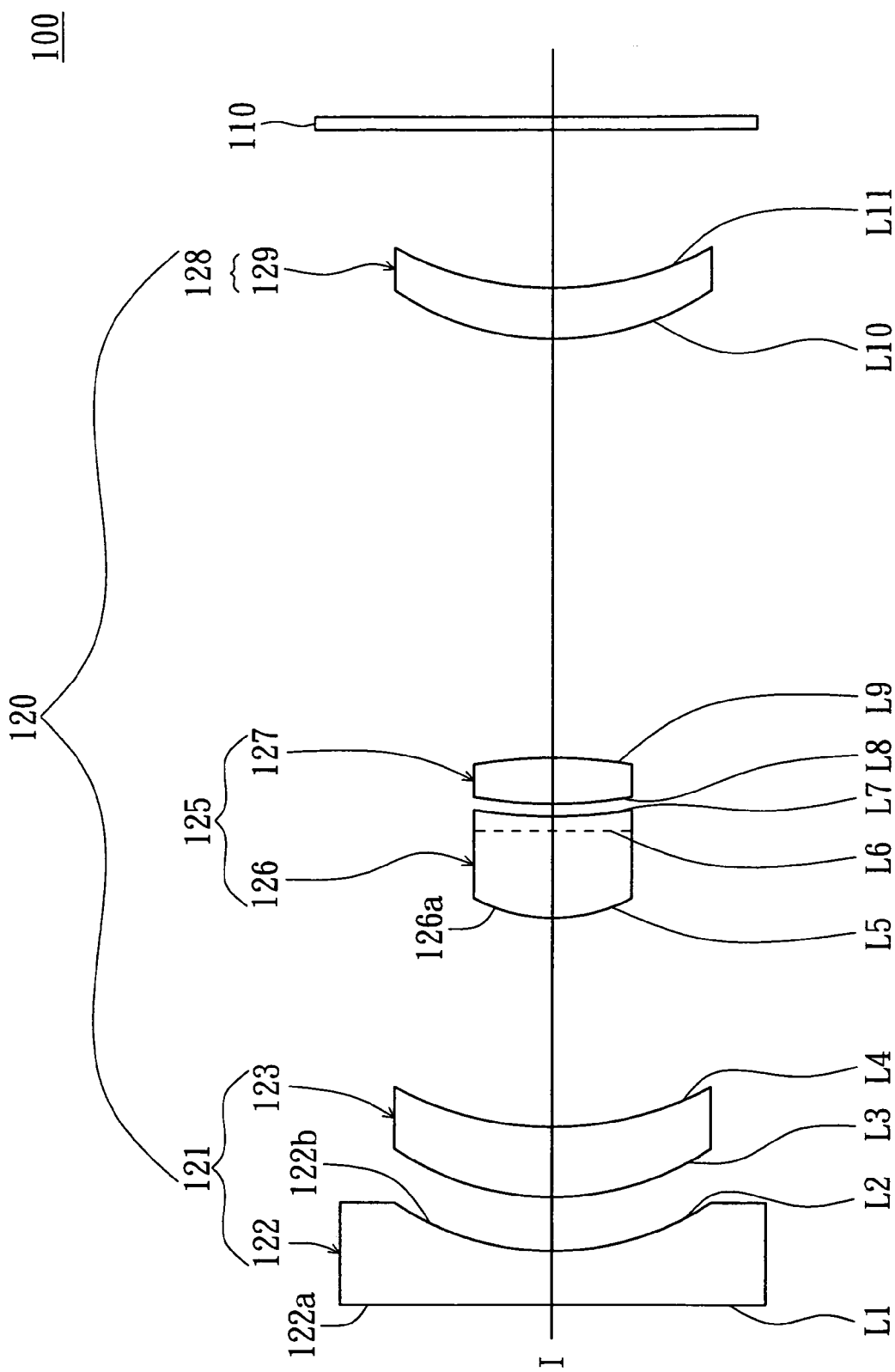
FIG. 1 is a partial structural diagram of an image acquisition apparatus according to a preferred embodiment of the invention.

Referring to FIG. 1, a partial structural diagram of an image acquisition apparatus according to a preferred embodiment of the invention is shown. Examples of the image acquisition apparatus 100 include digital still camera. The image acquisition apparatus 100 comprises a sensing element 110 and a zoom lens 120. Examples of the sensing element 110 include charge coupling device (CCD), complementary metal-oxide semiconductor (CMOS) or any photo sensors capable of sensing the luminance and converting the received photo signal into an electro signal. The zoom lens 120 having an effective focal length fw for the wide angle mode comprises a first lens group 121, a second lens group 125 and a third lens group 128.

The first lens group 121 has a negative effective power and an effective focal length f1, wherein $2.1<|f1/fw|<2.6$. The first lens group comprises a first lens 122 and a second lens 123. The first lens 122 has a first negative power and at least a first concave aspheric lens surface 122a or 122b. The second lens 123 has a first positive power. The present embodiment of the invention is exemplified by the first lens 122 having the first concave aspheric lens surface 122a.

The second lens group 125 disposed between the first lens group 121 and the sensing element 110 has a first positive effective power and an effective focal length f2, wherein $1.5<|f2/fw|<1.8$. The second lens group 125 comprises a third lens 126 and a fourth lens 127. The third lens 126 has a second positive power and at least a second aspheric lens surface 126a. The fourth lens 127 has a third positive power. The third lens group 128 disposed between the second lens group 125 and the sensing element 110 has a second positive effective power.

With the above restrictions on f1, f2 and fw, while the light beam projected to the image acquisition apparatus 100 from an image side I sequentially passes through the first lens group 121, the second lens group 125 and the third lens group 128 of the zoom lens 120 to form an image on the sensing element 110, the back focal length for the wide angle mode and the back focal length for the telephoto mode are both within an acceptable range. For example, the first lens group 121 has an effective focal length f1 of −14.24 mm, the second lens group 125 has an effective focal length f2 of 20.357 mm. The zoom lens 120 has an effective focal length fw of 6.210 mm for the wide angle mode. Meanwhile, the back focal length for the wide angle mode and the back focal length for the telephoto mode are respectively equal to 4 mm and 2.55 mm.

When the light beam comes from a remote object, that is, the zoom lens 120 enters the telephoto mode, the overall length of the zoom lens 120 is shorter than the overall length of which entering the wide angle when the light beam comes from a near object, no mechanic interference occurs among the three lens groups. For example, if the distance between the first lens group 121 and the second lens group 125 is reduced for the zoom lens 120 to enter telephoto mode, the collision of lens surface between two lens groups would be avoided. Besides, the zoom lens 120a further comprises an aperture stop disposed between the first lens group 121 and the second lens group 125. The restrictions on f1, f2 and fw also provide containing space for the elements, such as clamp devices or step motors, which control the aperture stop and the zooming or focusing of the three lens groups The situations when the f1, f2 and fw of the three lens groups of the zoom lens 120 fail to satisfy the above restrictions are elaborated below.

Figure 2A:
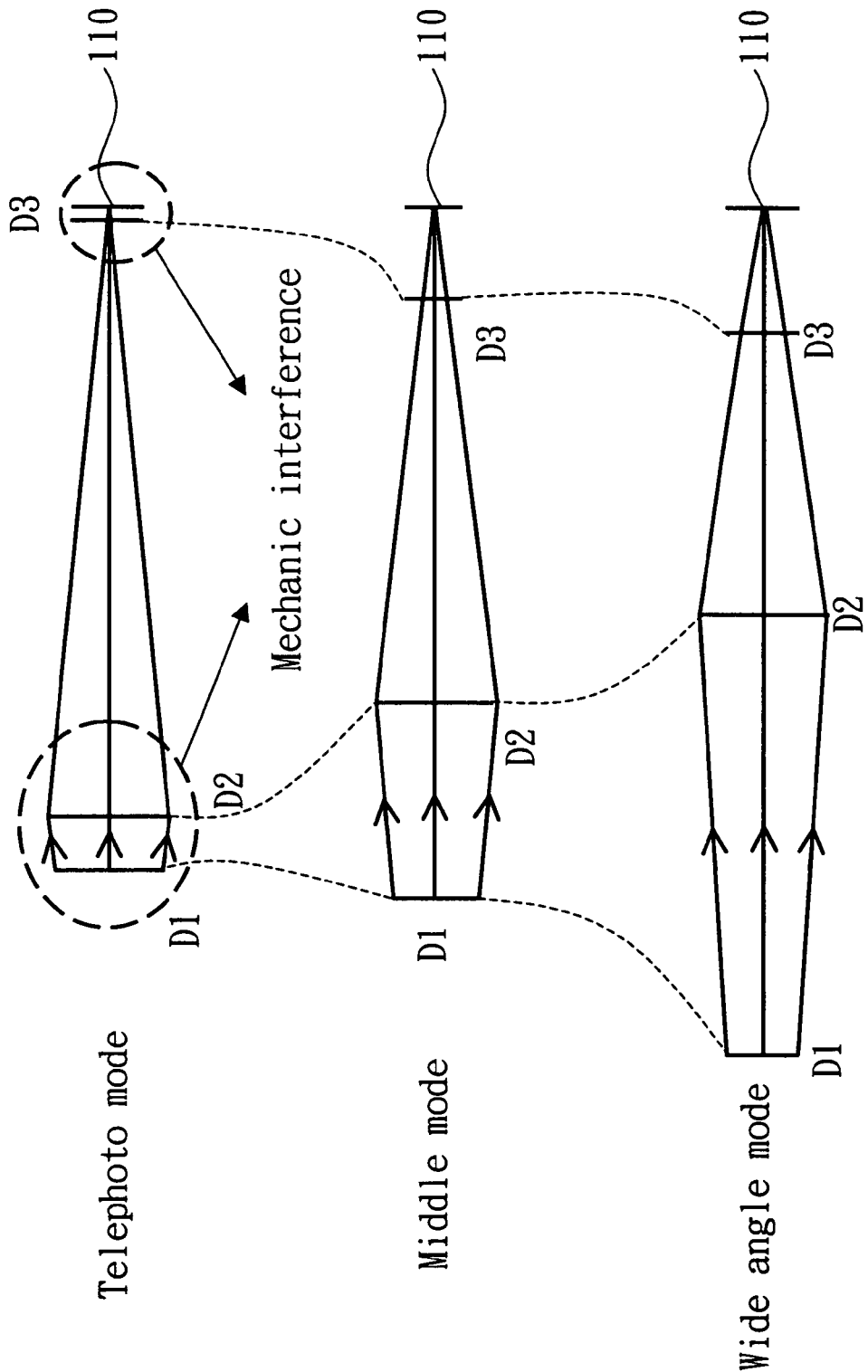
FIG. 2A is a diagram showing the variation in the intervals among the principle planes of three lens groups between the wide angle mode and the telephoto mode.

Referring to FIG. 2A, a diagram showing the variation in the intervals among the principle planes of three lens groups between the wide angle mode and the telephoto mode is shown. The distance between the principle plane D1 of the first lens group 121 and the principle plane D2 of the second lens group 125 is d12, while the distance between the principle plane D2 of the second lens group 125 and the principle plane D3 of the third lens group 128 is d23. The details are illustrated in Table 1.

TABLE 1

|  | Wide Angle Mode | Middle Mode | Telephoto Mode |
| --- | --- | --- | --- |
| d12 (mm) | 13.7244 | 6.1199 | 1.6733 |
| d23 (mm) | 8.5839 | 12.4384 | 18.4043 |

In FIG. 2A, the first lens group 121 has an effective focal length f1 of −17.6166 mm, the second lens group 125 has an effective focal length f2 of 9.3542 mm, the third lens group 128 has an effective focal length f3 of 19.0646 mm, and the zoom lens 120 has an effective focal length fw of 6 mm for the wide angle mode. That is, $|f1/fw|=17.6166/6=2.936$ is larger than 2.6, the upper limit of the invention.

Thus, when the zoom lens enters the telephoto mode from the wide angle mode, the distance d12 between the principle plane D1 of the first lens group 121 and the principle plane D2 of the second lens group 125 is reduced to 1.6733 mm from 13.7244 mm, while the distance d23 between the principle plane D2 of the second lens group 125 and the principle plane D3 of the third lens group 128 is increased to 18.4043 mm from 8.5839 mm. As shown in FIG. 2A, mechanic interference not only occurs between the first lens group 121 and the second lens group 125 but also occurs between the third lens group 128 and the filter or glass plate disposed between the third lens group 128 and the sensing element 110.

Figure 2B:
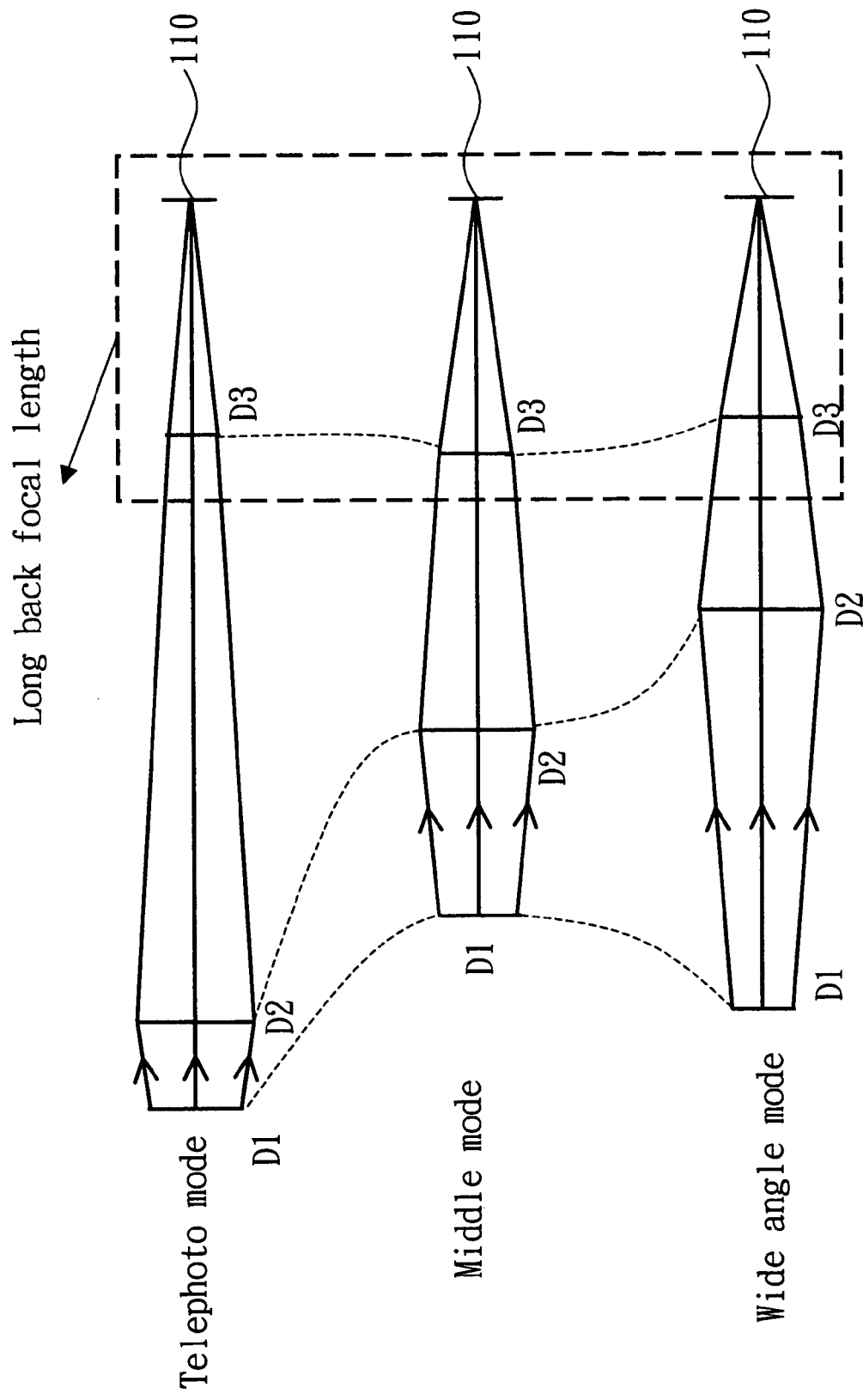
FIG. 2B is another diagram showing the variation the intervals among the principle planes of three lens groups between wide angle mode and telephoto mode.

Referring to FIG. 2B, another diagram showing the variation in the intervals among the principle planes of three lens groups between the wide angle mode and the telephoto mode is shown. The distance between the principle plane D1 of the first lens group 121 and the principle plane D2 of the second lens group 125 is d12, while the distance between the principle plane D2 of the second lens group 125 and the principle plane D3 of the third lens group 128 is d23. The details are illustrated in Table 2.

TABLE 2

|  | Wide Angle Mode | Middle Mode | Telephoto Mode |
| --- | --- | --- | --- |
| d12 (mm) | 14.3449 | 6.5951 | 3.0881 |
| d23 (mm) | 6.8802 | 9.9725 | 20.9102 |

In FIG. 2B, the first lens group 121 has an effective focal length f1 of −14.4221 mm, the second lens group 125 has an effective focal length f2 of 11.7393 mm, the third lens group 128 has an effective focal length f3 of 19.7100 mm, and the zoom lens 120 has an effective focal length fw of 6 mm for the wide angle mode. That is, $|f2/fw|=11.7393/6=1.95$ is larger than 1.8, the upper limit of the invention.

Thus, when the zoom lens enters the telephoto mode from the wide angle mode, the distance d12 between the principle plane D1 of the first lens group 121 and the principle plane D2 of the second lens group 125 is reduced to 3.0881 mm from 14.3449 mm, while the distance d23 between the principle plane D2 of the second lens group 125 and the principle plane of D3 of the third lens group 128 is increased to 20.9102 mm from 6.8802 mm. As shown in FIG. 2B, the overall length of the zoom lens 120 for the telephoto mode is larger than the overall length of the zoom lens 120 for the wide angle mode, and both the back focal length for the wide angle mode and the back focal length for the telephoto mode are obviously too long.

In order to achieve preferred zooming, focusing and imaging effect, in the present embodiment of the invention, the second lens group 125 and the third lens group 128 are designed to have an effective focal length f23, and the third lens group 128 is designed to have an effective focal length f3, wherein 0.3<|f1/f23|<1.6, 0.3<|f2/f3|<0.8. Besides, the distance d12 between the principle plane of the first lens group 121 and the principle plane of the second lens group 125, and the distance d23 between the principle plane of the second lens group 125 and the principle plane of the third lens group 128 is designed to satisfy 0.05<d12/d23<1.6.

The characteristics and the dispositions of the lens used in the three lens groups of the zoom lens 120 are exemplified below. However, the technology of the present embodiment of the invention is not limited thereto.

As shown in FIG. 1, the first lens 122 being a concavo-caoncave lens has a first concave lens surface L1 and a second concave lens surface L2. In the present embodiment of the invention, the first concave aspheric lens surface 122a is the first concave lens surface L1, the second concave lens surface L2 is a third aspheric lens surface 122b, and the refraction index, the Abbe number and the focal length of the first lens 122 are respectively equal to 1.792, 38.823 and −6.870 mm. Besides, the aspheric surface curve is expressed in the following polynomial function:

$$\frac{X^2}{R + \sqrt{R^2 - (1+k)X^2}} + A_4 X^4 + A_6 X^6 + A_8 X^8 + A_{10} X^{10} + \ldots$$

X is the horizontal distance to an axis of rotational symmetry, R is a curvature radius of apex, k is a conic section constant, $A_{2n}$ is an aspheric correaction coefficient of $X^{2n}$, and n is a positive integer. In the present embodiment of the invention, the first concave aspheric lens surface 122a has:

a curvature radius of apex R being −85.4 mm;

a conic section constant k being 0.5680112;

an aspheric correaction coefficient $A_4$ of $X^4$ being $1.20176 \times 10^{-3}$;

an aspheric correaction coefficient $A_6$ of $X^6$ being $-4.46 \times 10^5$;

an aspheric correaction coefficient $A_8$ of $X^8$ being $9.16597 \times 10_{-7}$; and an aspheric correaction coefficient $A_{10}$ of $X^{10}$ being $-7.6361 \times 10^{-9}$.

The third aspheric lens surface 122b has:

a curvature radius of apex R being 5.852 mm;

a conic section constant k being −3.697127;

an aspheric correaction coefficient $A_4$ of $X^4$ being $3.46392 \times 10^{-3}$;

an aspheric correaction coefficient $A_6$ of $X^6$ being $-7.01758 \times 10^{-5}$;

an aspheric correaction coefficient $A_8$ of $X^8$ being $4.0297 \times 10^{-7}$; and an aspheric correaction coefficient $A_{10}$ of $X^{10}$ being $2.57587 \times 10^{-8}$.

The second lens 123 has a first convex lens surface L3 and a third concave lens surface L4. The curvature radius of the first convex lens surface L3 and the curvature radius of the third concave lens surface L4 are respectively equal to 7.534 mm and 15.387 mm. Besides, the refraction index, the Abbe number and the focal length of the second lens 123 are respectively equal to 1.93 mm, 21.108 mm and 14.398 mm. Meanwhile, as shown in FIG. 1, the first convex lens surface L3 faces the second concave lens surface L2 of the first lens 122, while the third concave lens surface L4 is positioned against the second concave lens surface L2.

Besides, the third lens 126 being a doublet lens has a second convex lens surface L5, a doublet lens surface L6 and a fourth concave lens surface L7. In the present embodiment of the invention, the second aspheric lens surface 126a being the second convex lens surface L5 has:

a curvature radius of apex R being 4.427 mm;

a conic section constant k being 1.195661;

an aspheric correaction coefficient $A_4$ of $X^4$ being $-2.30824 \times 10^{-3}$;

an aspheric correaction coefficient $A_6$ of $X^6$ being $-2.49636 \times 10^4$;

an aspheric correaction coefficient $A_8$ of $X^8$ being $1.52876 \times 10^{-5}$; and an aspheric correaction coefficient $A_{10}$ of $X^{10}$ being $4.71433 \times 10^{-6}$.

The curvature radius of the doublet lens surface L6 and the curvature radius of the fourth concave lens surface L7 are respectively equal to −6.582 mm and 3.066 mm. Meanwhile, the second convex lens surface L5 faces the third concave lens surface L4, the doublet lens surface L6 is positioned between the second convex lens surface L5 and the fourth concave lens surface L7, the fourth concave lens surface L7 is positioned against the third concave lens surface L4. The third lens 126 can be obtained by adhering two lenses together to achieve the lens surface relationship. For example, of the two lenses, the one whose refraction index, Abbe number and focal length respectively equal to 1.804, 40.183 and 5.249 mm has the second convex lens surface L5 and the doublet lens surface L6, while the other lens whose refractiong index, Abbe number and focal length respectively equal to 1.728 mm, 28.564 mm and −5.256 mm has the doublet lens surface L6 and the fourth concave lens surface L7.

The fourth lens 127 has a third convex lens surface L8 and a fourth convex lens surface L9. The curvature radius of the third convex lens surface L8 and the curvature radius of the fourth convex lens surface L9 are respectively equal to 12.327 mm and −19.417 mm. Besides, the refractiong index, the Abbe number and the focal length of the fourth lens 127 are respectively equal to 1.616, 60.812 and 12.402 mm. Meanwhile, the third convex lens surface L8 faces the fourth concave lens surface L7, while the fourth convex lens surface L9 is positioned against the fourth concave lens surface L7.

The third lens group 128 comprises a fifth lens 129 having a fourth positive power. Besides, the fifth lens 129 being a meniscus lens has a fifth convex lens surface L10 and a fifth concave lens surface L1.

In the present embodiment of the invention, further restrictions are imposed on the meniscus characteristics of the fifth lens 129 used for focusing. That is, the curvature radius of the fifth convex lens surface L10 and the curvature radius of the fifth concave lens surface L11 are respectively equal to R1 and R2, wherein $-1.8<(R1+R2)/(R1-R2)<-0.6$. For example, R1 and R2 are respectively equal to 16.253 mm and 355.739 mm. Meanwhile, the fifth convex lens surface L10 faces the fourth convex lens surface L9, while the fifth concave lens surface L11 is positioned against the fourth convex lens surface L9. Besides, the refracting index, the Abbe number and the focal length of the fifth lens 129 are respectively equal to 1.835, 44.131 and 20.357 mm.

The distances among the surfaces of the lenses used in the zoom lens 100 of the present embodiment of the invention are illustrated in Table 3.

TABLE 3

| Lens Surface Li | Distance to the Lens Surface L(i + 1) (mm) |
|---|---|
| L1 | 1.276 |
| L2 | 1.290 |
| L3 | 1.668 |
| L4 | 11.453 (wide angle mode)~1.643 (telephoto mode) |
| L5 | 2.086 |
| L6 | 0.507 |
| L7 | 0.305 |
| L8 | 1.104 |
| L9 | 5.893 (wide angle mode)~16.680 (telephoto mode) |
| L10 | 1.212 |

Figure 3A:
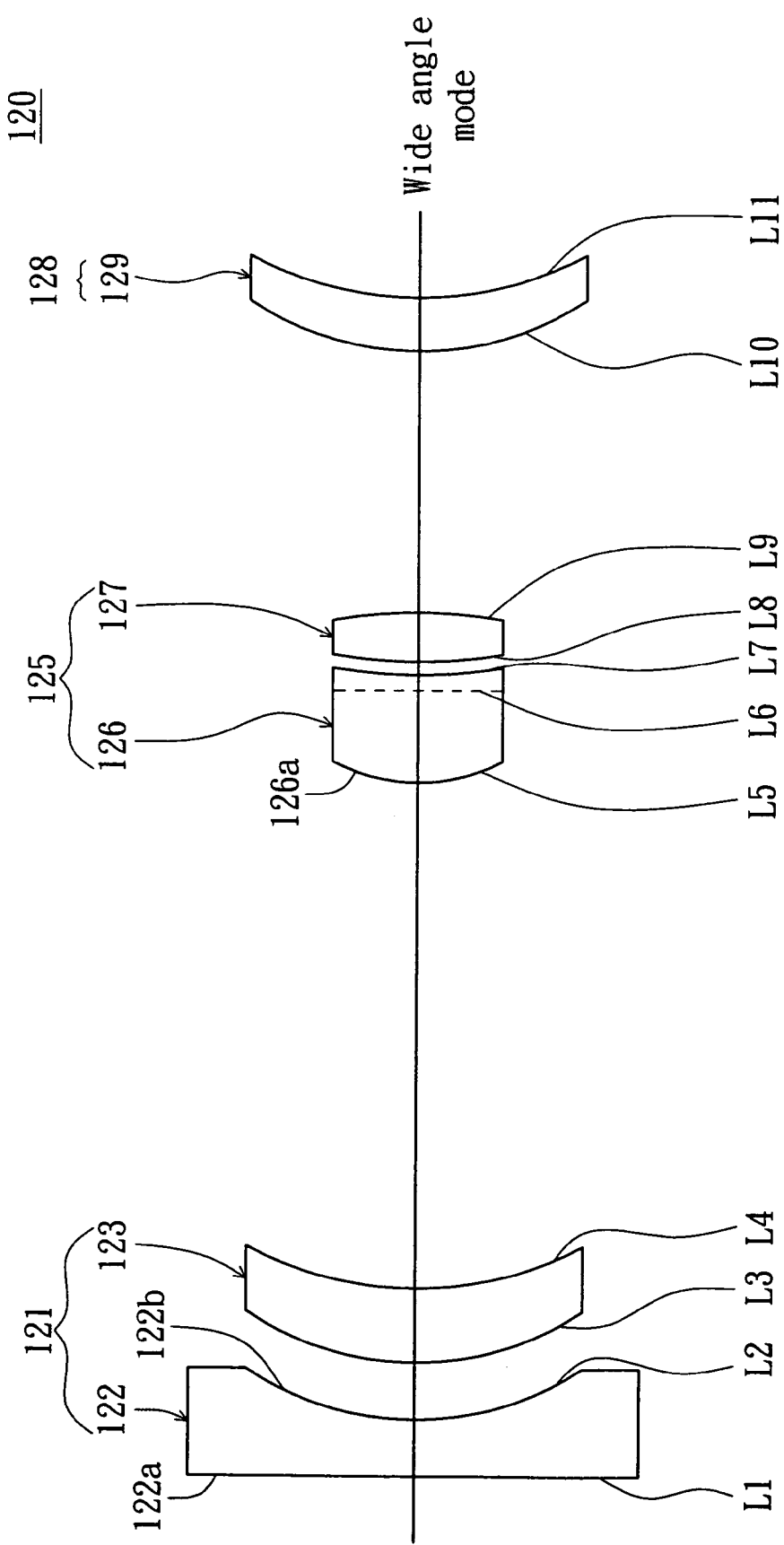
FIGS. 3A and 3B are diagrams when the zoom lens according to a preferred embodiment of the invention is at the wide angle mode and the telephoto mode respectively.
Figure 3B:
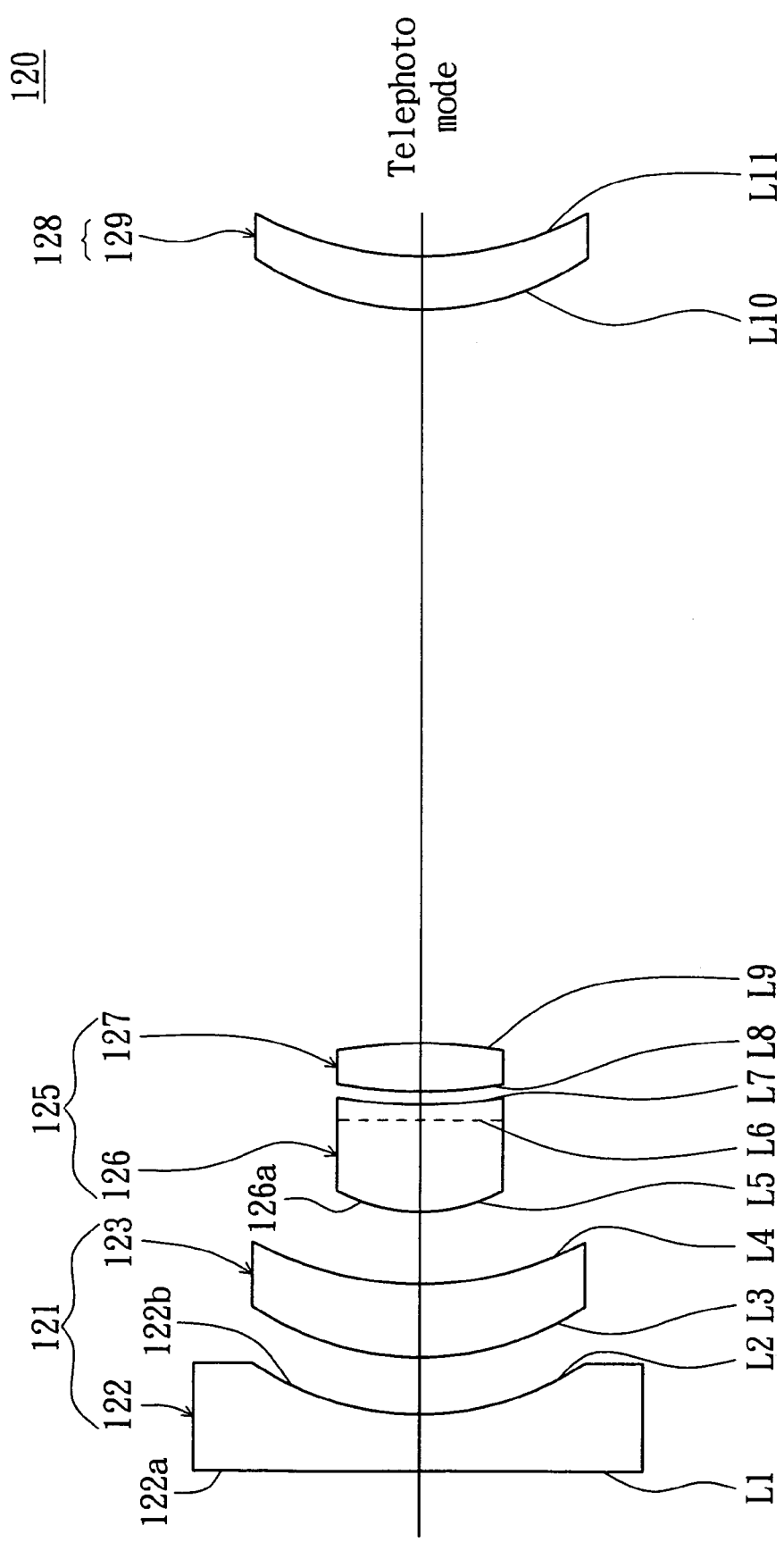

Referring to FIGS. 3A and 3B, two diagrams when the zoom lens according to a preferred embodiment of the invention is at the wide angle mode and the telephoto mode respectively are shown. For example, when the object is about 1000 mm from the first concave lens surface L1, the zoom lens 120 enters the wide angle mode as shown in FIG. 3A. That is, the distance between the third concave lens surface L4 and the second convex lens surface L5 is adjusted to be 11.453 mm to achieve zooming effect, and the distance between the fourth convex lens surface L9 and the fifth convex lens surface L1 is adjusted to be 5.893 mm to achieve focusing effect. By doing so, the zoom lens 120 has an effective focal length fw of 6.210 mm for the wide angle mode.

On the other hand, when the distance between the object and the first concave lens surface L1 increases to be about 2000 mm, the zoom lens 120 enters the telephoto mode as shown in FIG. 3B. That is, the distance between the third concave lens surface L4 and the second convex lens surface L5 is adjusted to be 1.643 mm to achieve zooming effect, and the distance between the fourth convex lens surface L9 and the fifth convex lens surface L1 is adjusted to be 16.680 mm to achieve focusing effect. By doing so, the zoom lens 120 has an effective focal length ft of 16.210 mm for the telephoto mode. That is, the zoom ratio ft/fw is 3.

Figure 4A:
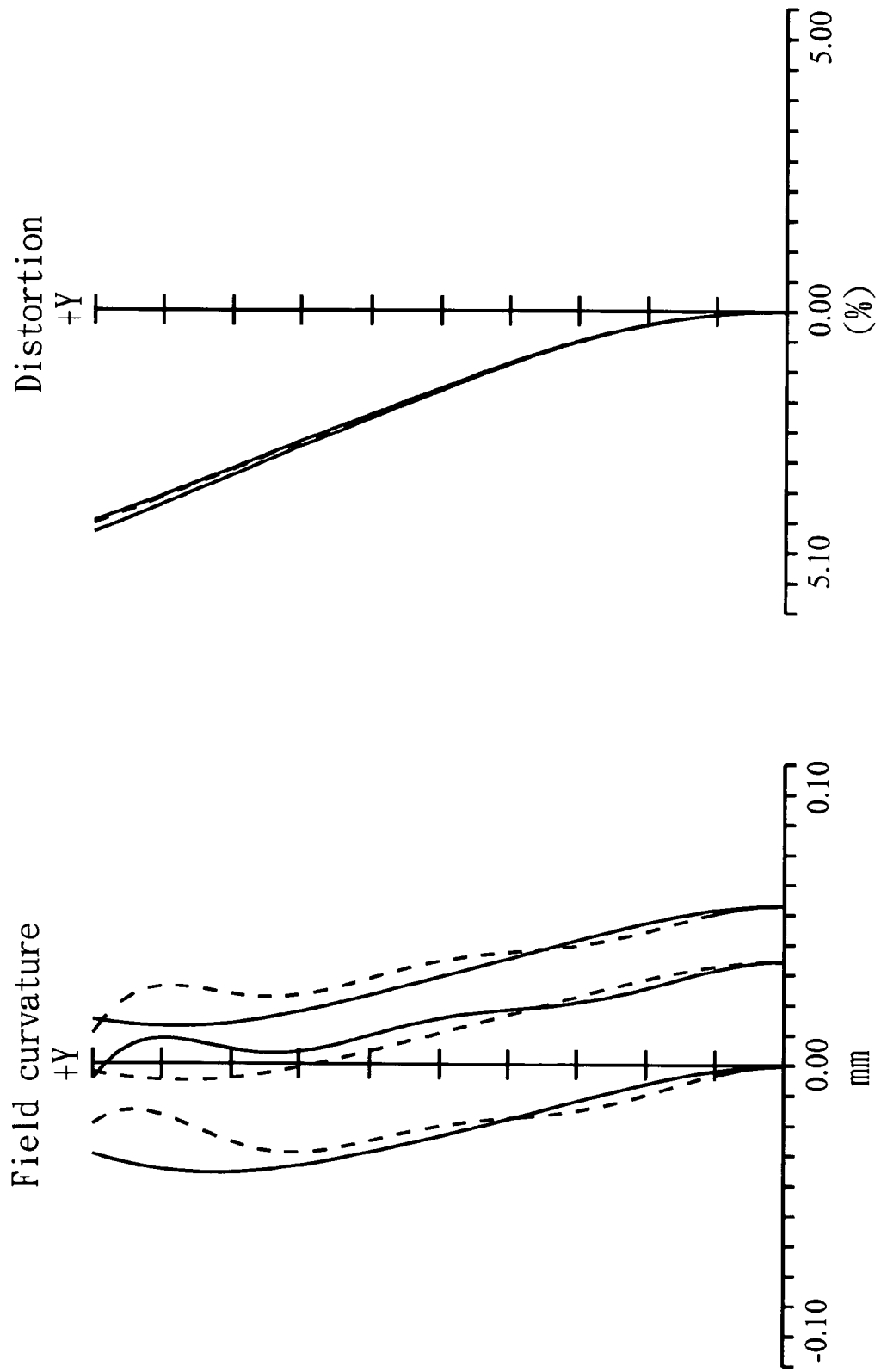
FIGS. 4A and 4B are diagrams showing the field curvature curve and the distortion curve when the zoom lens according to a preferred embodiment of the invention is at the wide angle mode and the telephoto mode respectively.
Figure 4B:
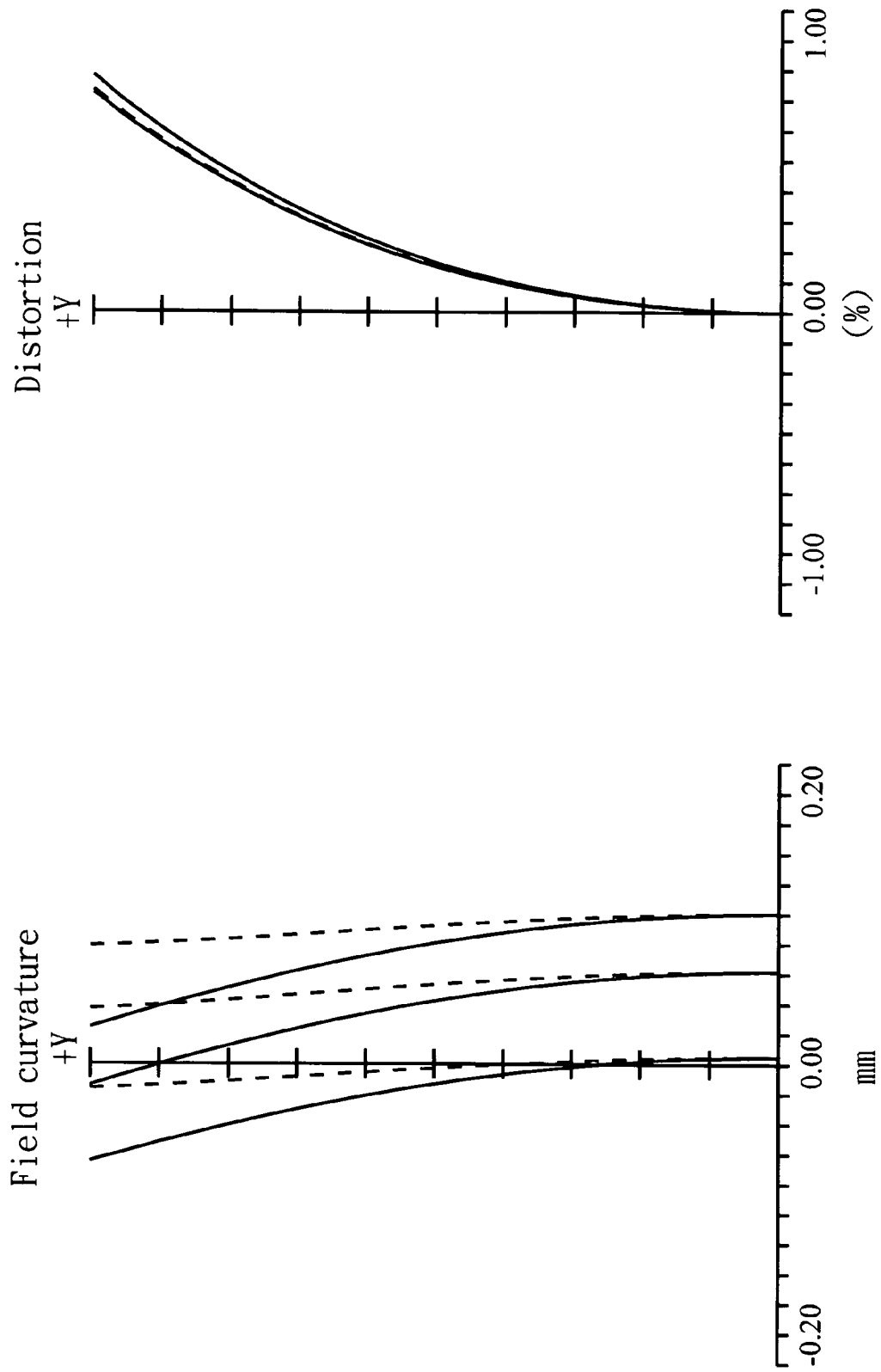

Referring to FIGS. 4A and 4B, two diagrams showing the field curvature curve and the distortion curve when the zoom lens according to a preferred embodiment of the invention is at the wide angle mode and the telephoto mode respectively are shown. As shown in FIGS. 4A and 4B, the obtained numeric of the field curvature and the distortion when the zoom lens 120 of the present embodiment of the invention is at the wide angle mode and the telephoto mode falls within a standar range.

Figure 5B:
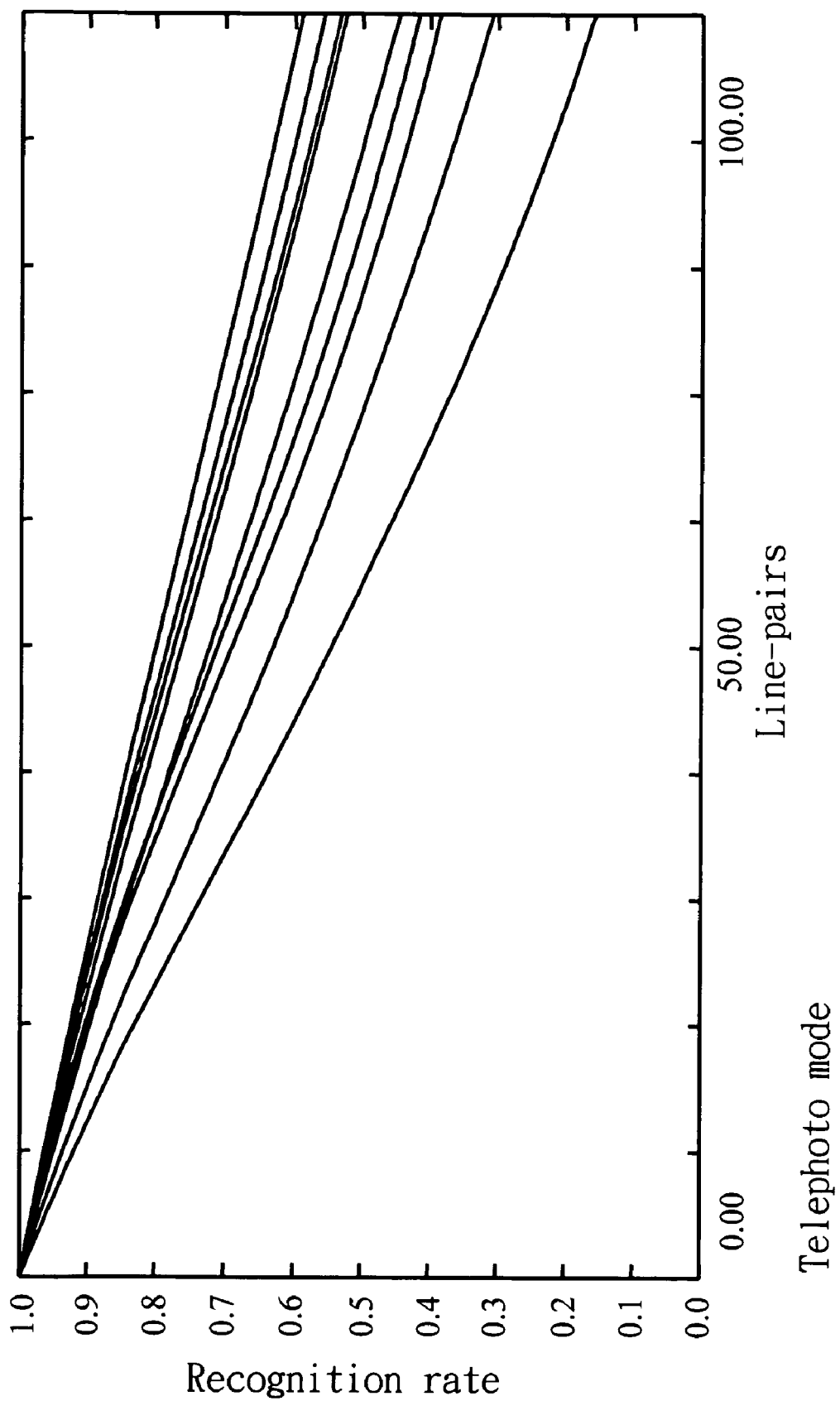

Referring to FIGS. 5A and 5B, diagrams showing the relationship between recognition rate and line-pairs when the zoom lens according to a preferred embodiment of the invention is at the wide angle mode and the telephoto mode respectively are shown. As shown in FIGS. 5A and 5B, the obtained numeric of the line-pairs and the recognition rate when the zoom lens 120 of the present embodiment of the invention is at the wide angle mode and the telephoto mode falls within a standar range.

Figure 6A:
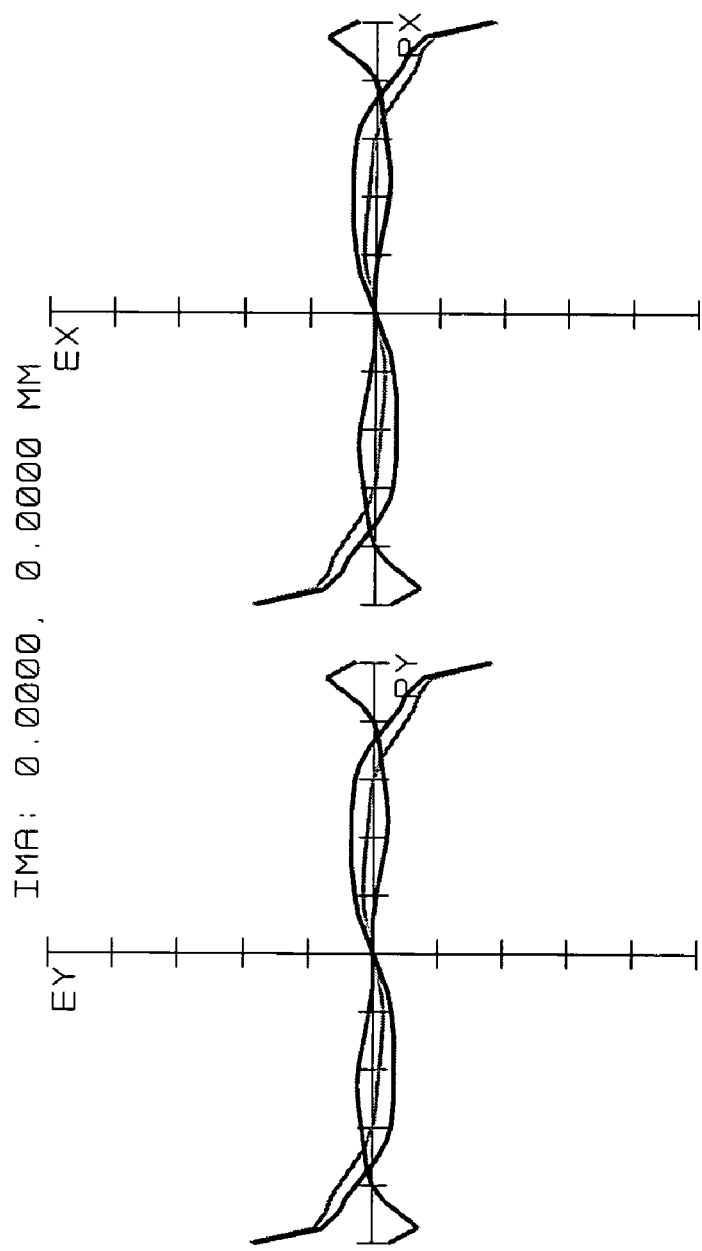
FIGS. 6A and 6B are diagrams showing the light aberration when the zoom lens according to a preferred embodiment of the invention is at the wide angle mode and the telephoto mode respectively.
Figure 6A:
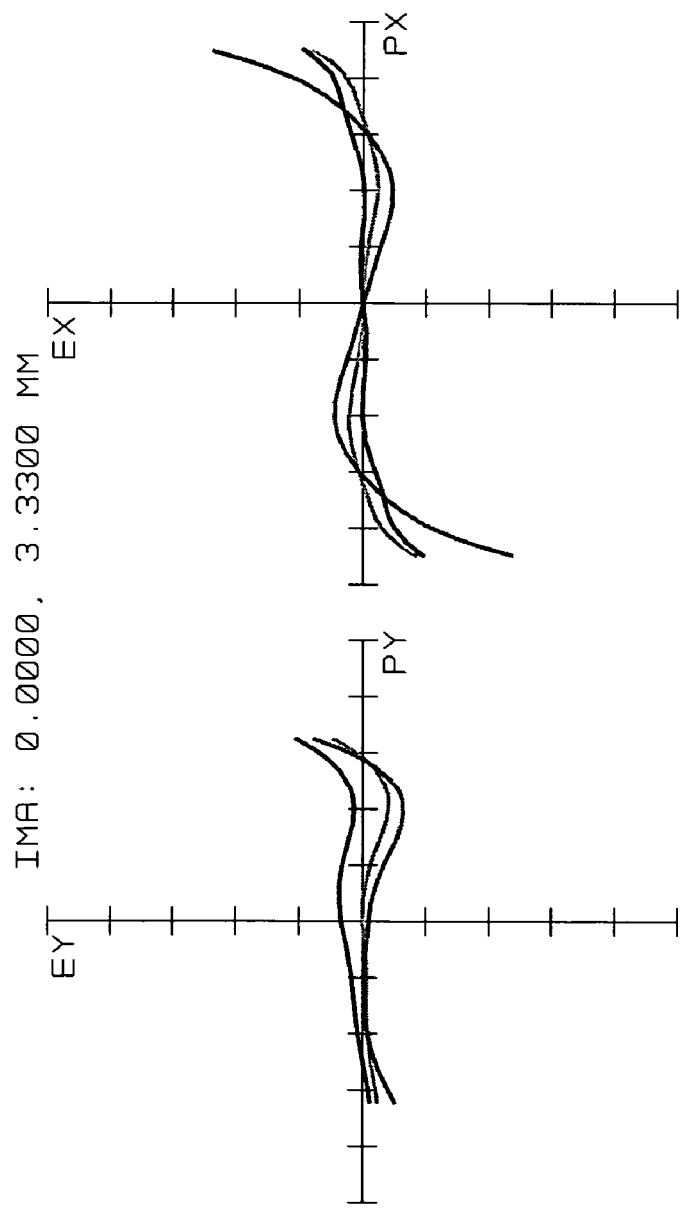
Figure 6A:
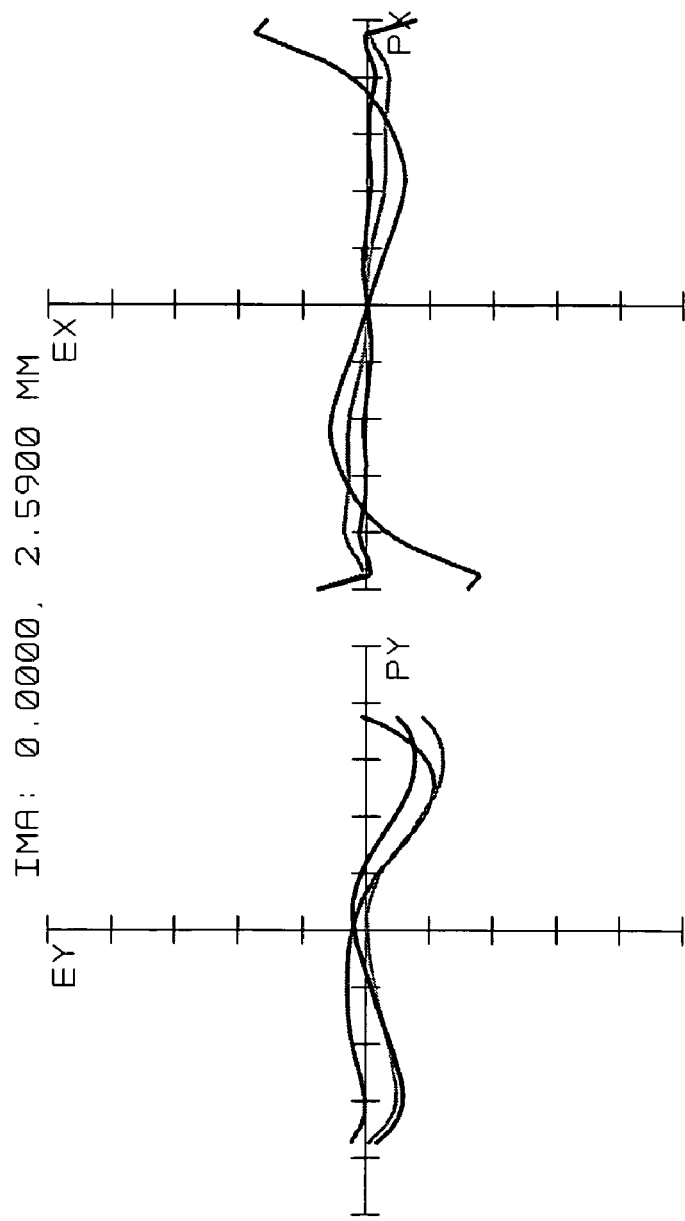
Figure 6A:
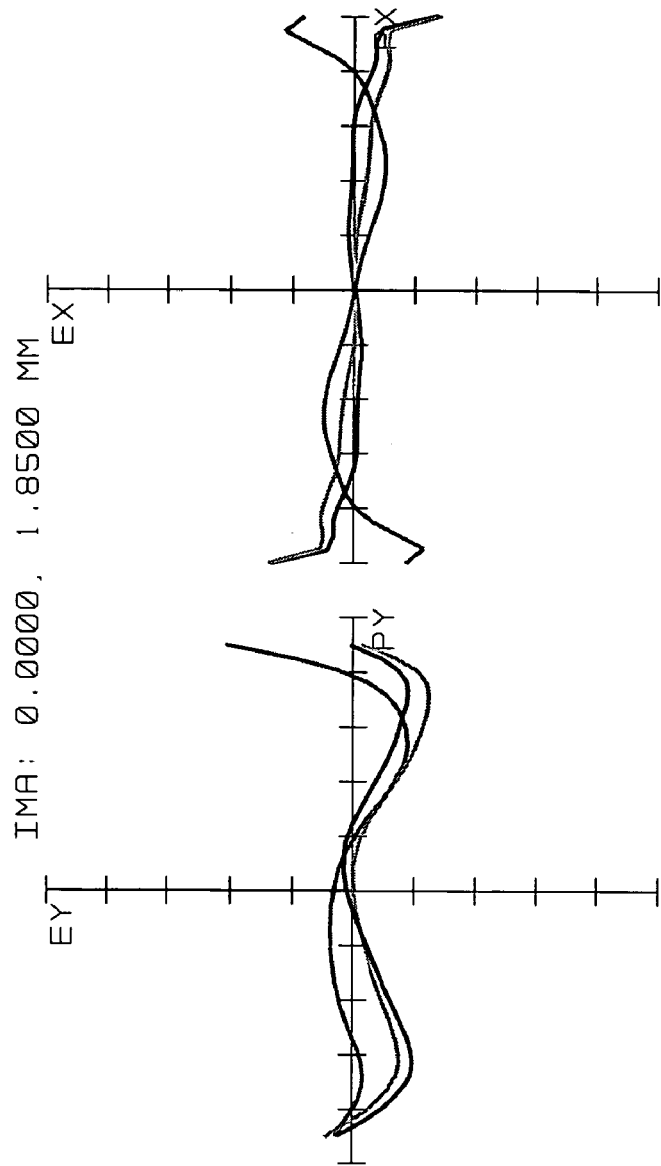
Figure 6A:
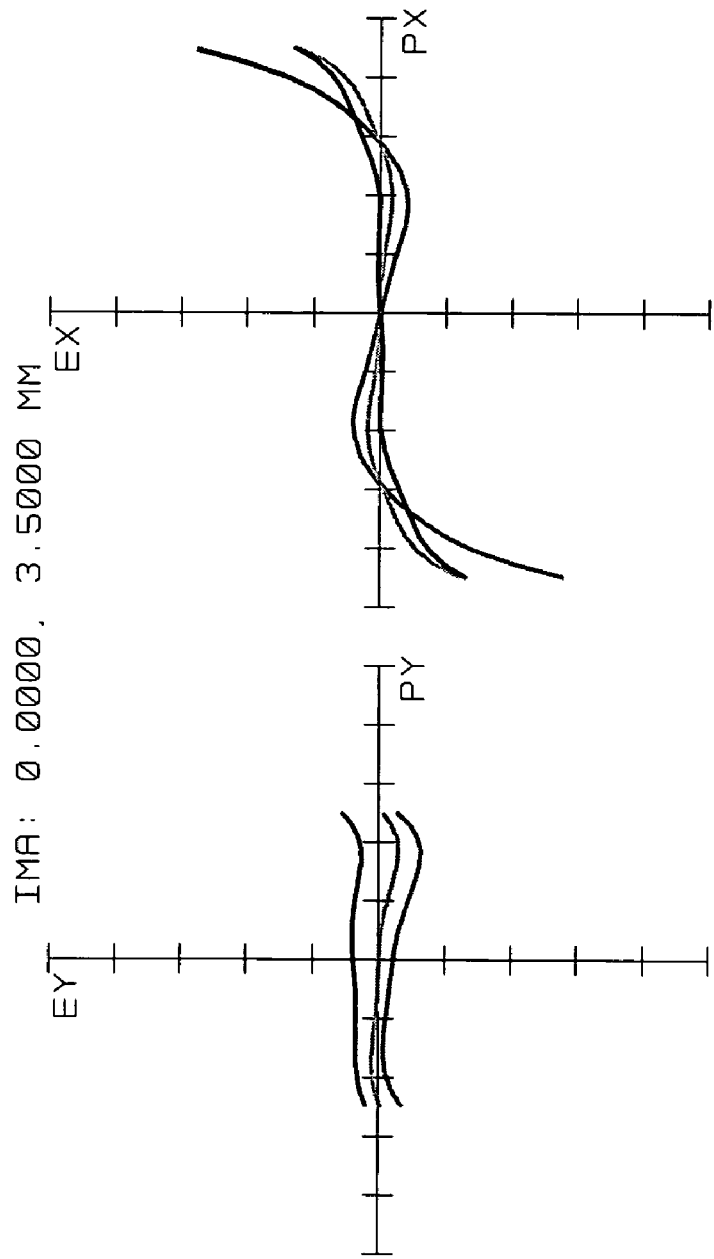
Figure 6B:
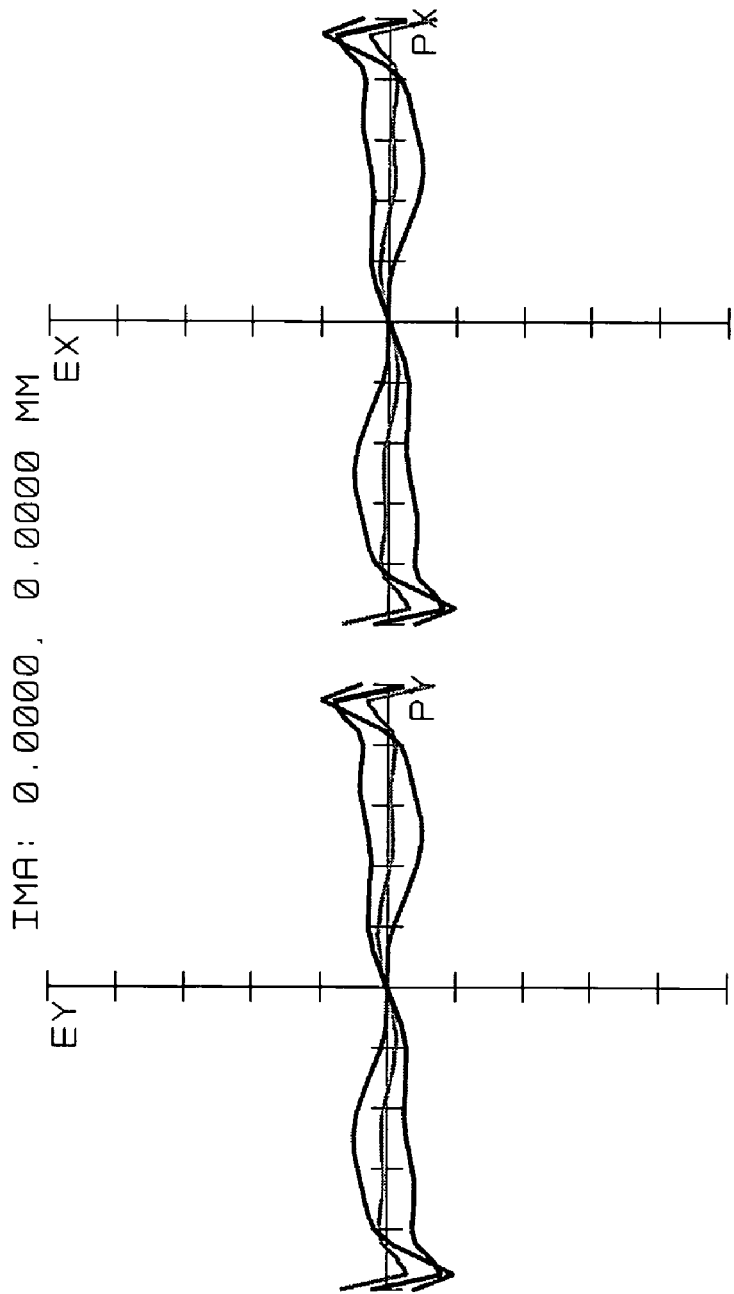
Figure 6B:
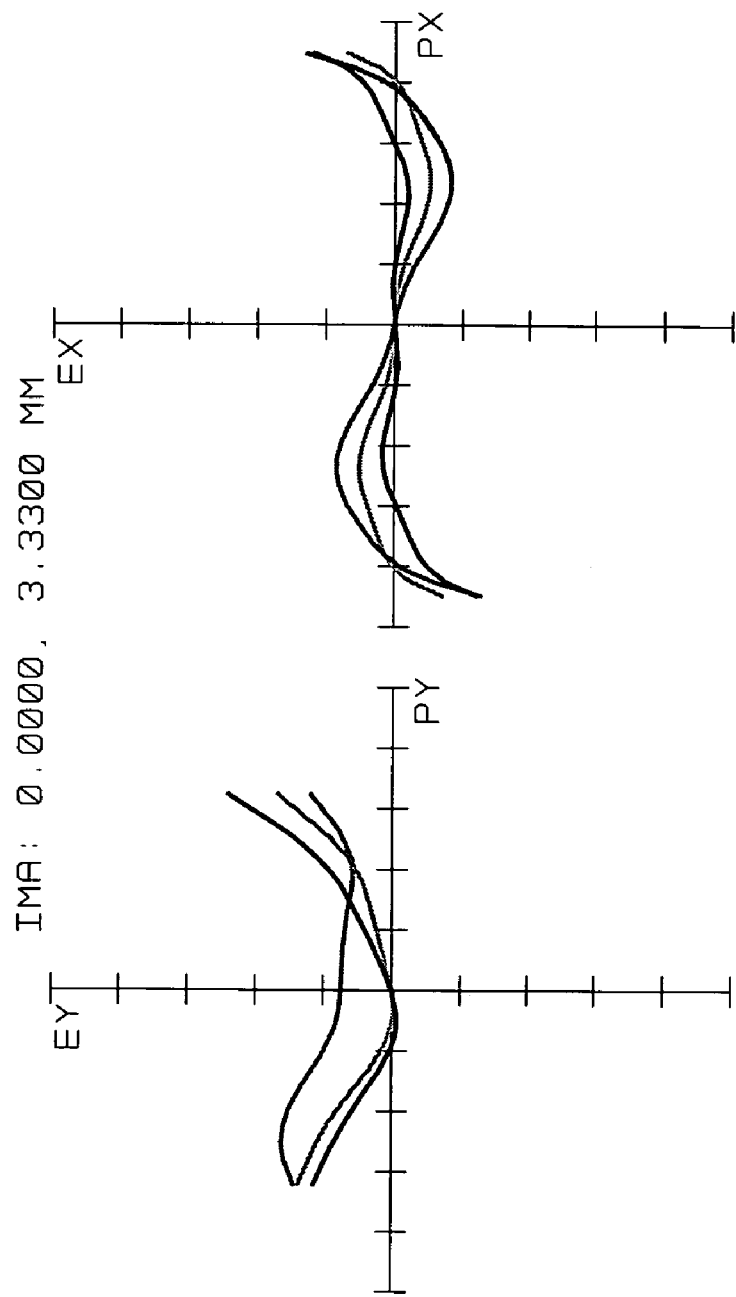
Figure 6B:
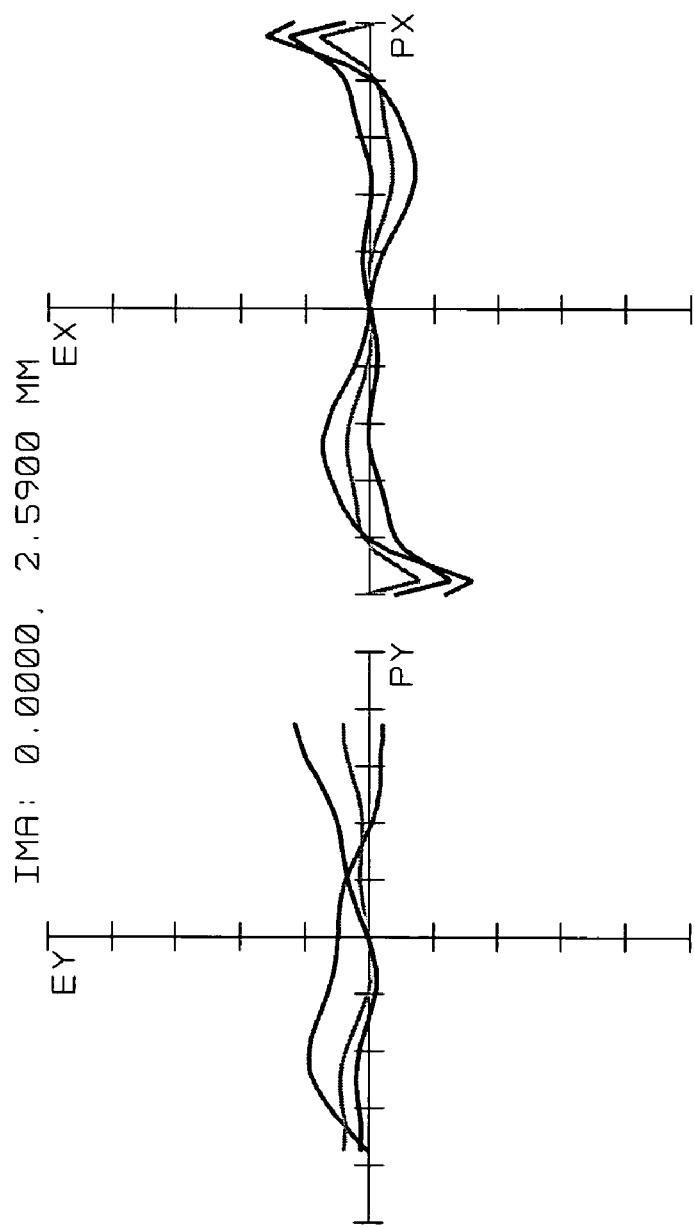
Figure 6B:
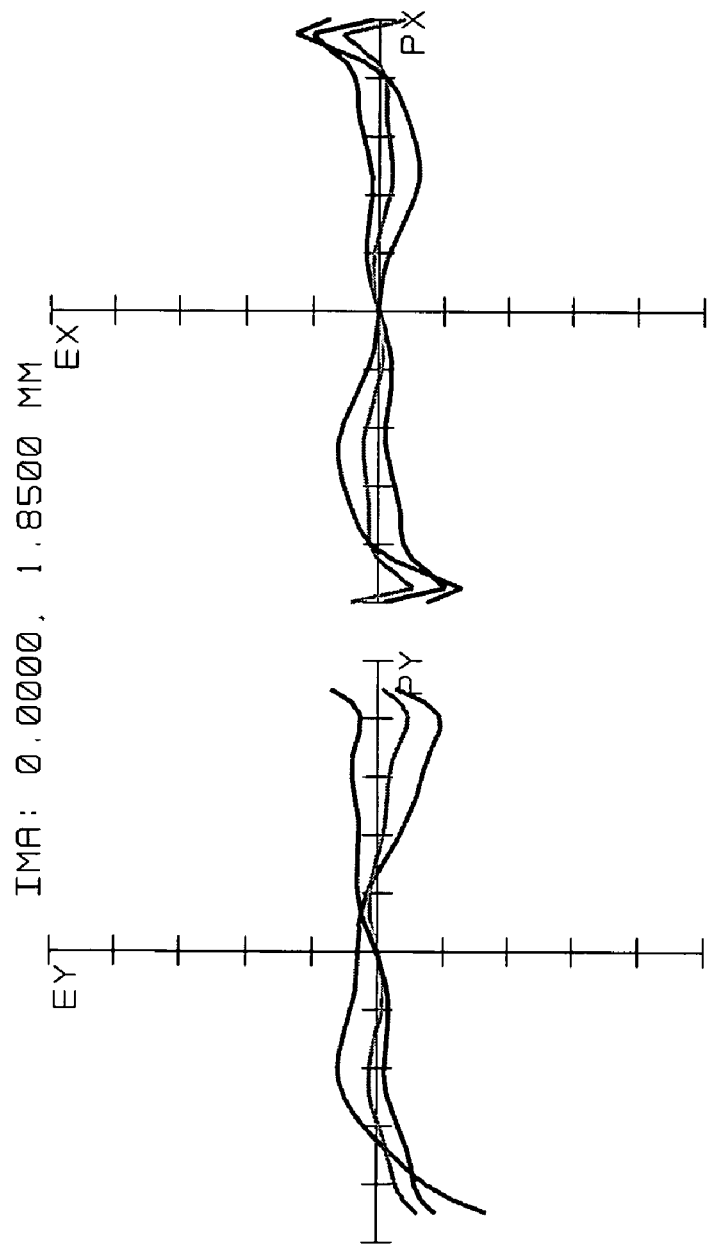
Figure 6B:
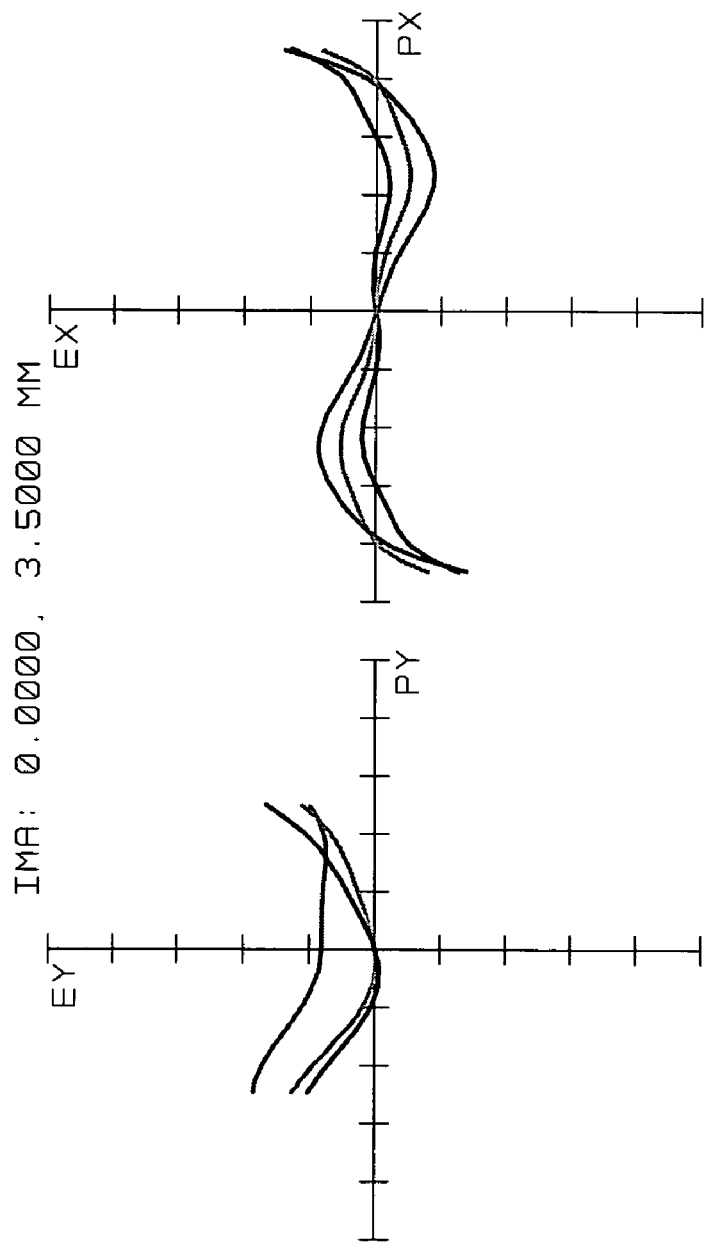

Referring to FIGS. 6A and 6B, two diagrams showing the light aberration when the zoom lens according to a preferred embodiment of the invention is at the wide angle mode and the telephoto mode respectively are shown. As shown in FIGS. 6A and 6B, the obtained numeric of the light aberration when the zoom lens 120 of the present embodiment of the invention is at the wide angle mode and the telephoto mode falls within a standar range.

Figure 7A:
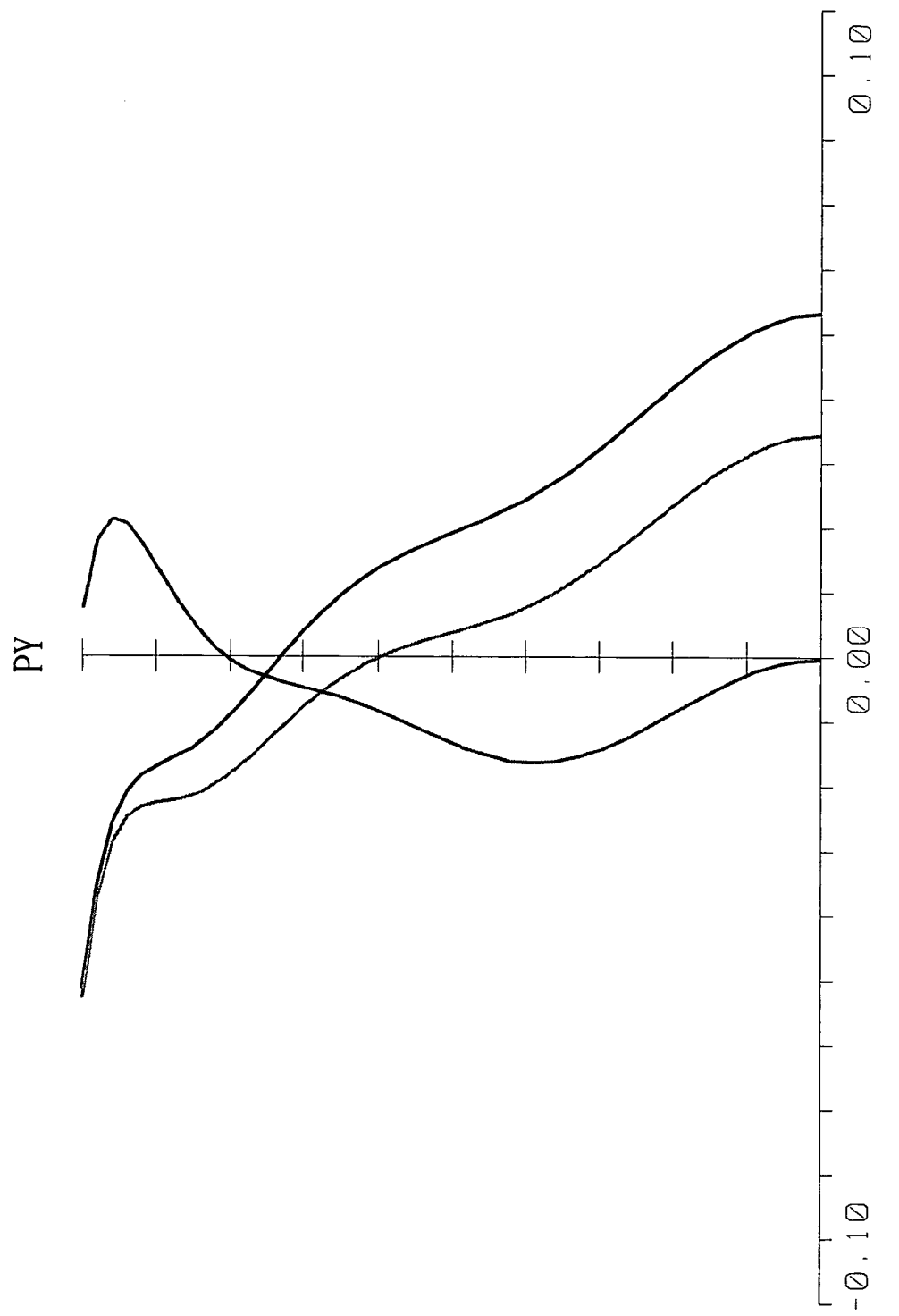
FIGS. 7A and 7B are diagrams showing the vertical color difference when the zoom lens according to a preferred embodiment of the invention is at the wide angle mode and the telephoto mode respectively
Figure 7B:
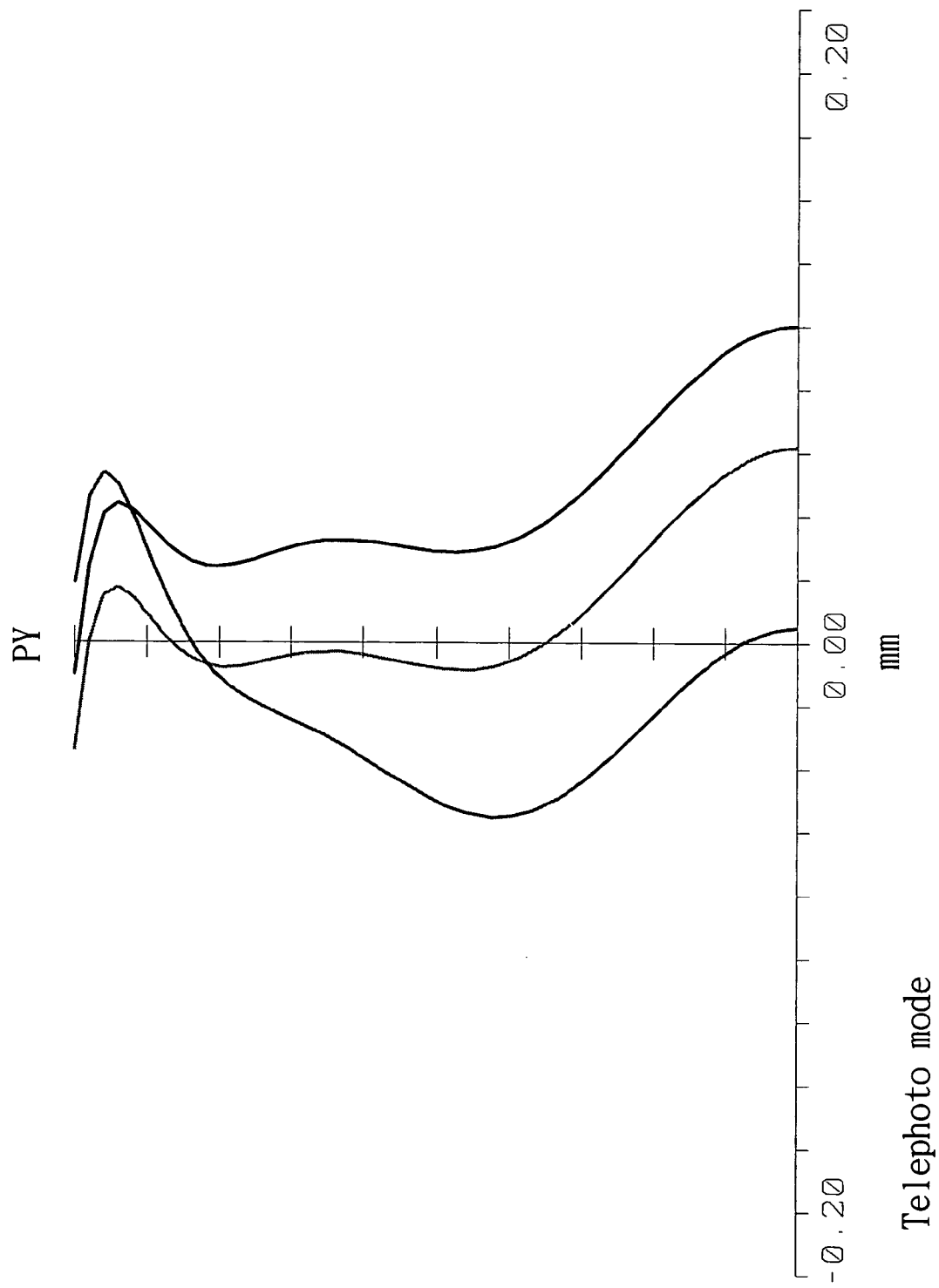

Referring to FIGS. 7A and 7B, diagrams showing the vertical color difference when the zoom lens according to a preferred embodiment of the invention is at the wide angle mode and the telephoto mode respectively are shown. As shown in FIGS. 7A and 7B, the obtained numeric of the vertical color difference when the zoom lens 120 of the present embodiment of the invention is at the wide angle mode and the telephoto mode falls within a standar range.

Figure 8A:
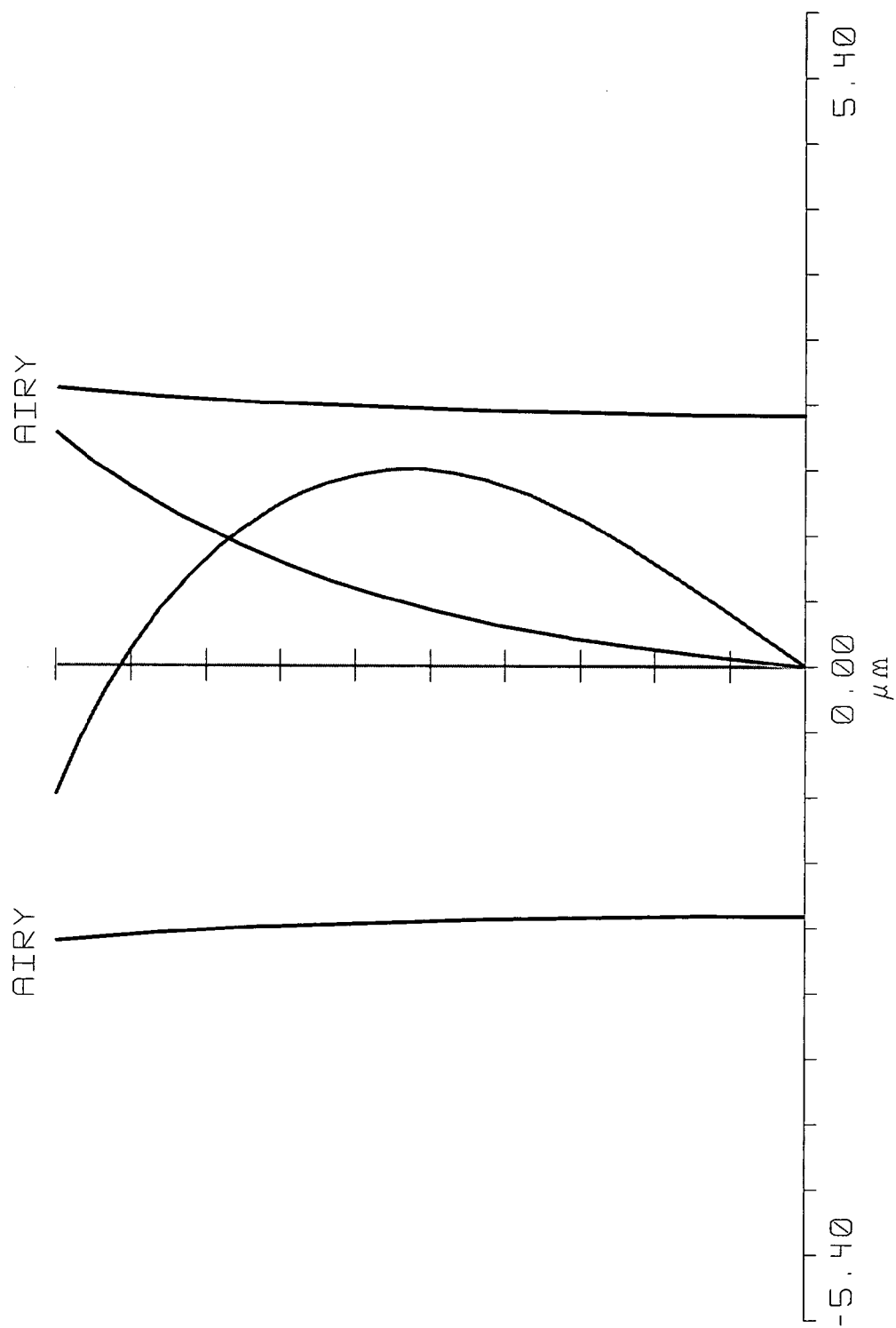
FIGS. 8A and 8B are diagrams showing the horizontal color difference when the zoom lens according to a preferred embodiment of the invention is at the wide angle mode and the telephoto mode respectively.
Figure 8B:
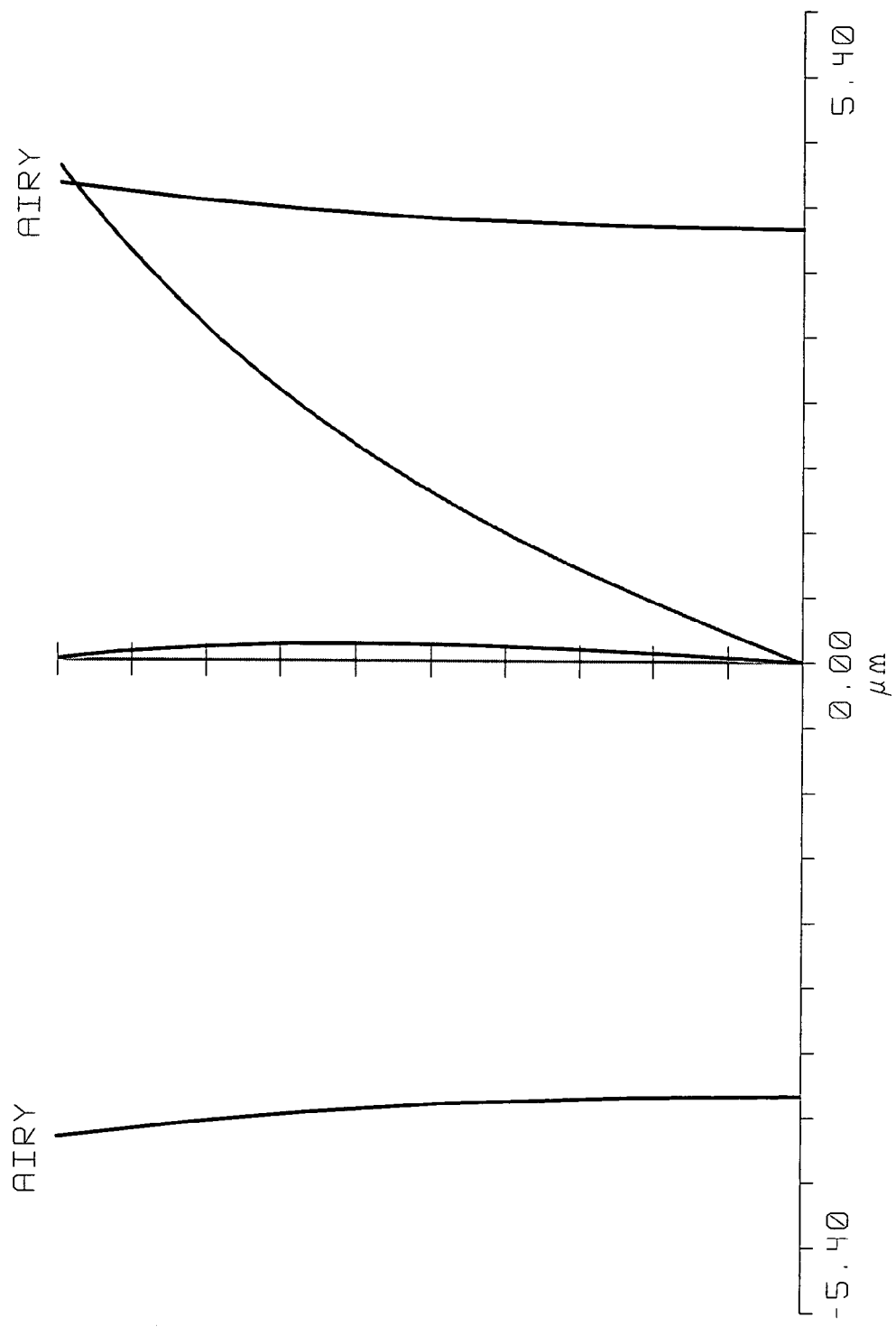

Referring to FIGS. 8A and 8B, diagrams showing the horizontal color difference when the zoom lens according to a preferred embodiment of the invention is at the wide angle mode and the telephoto mode respectively are shown. As shown in FIGS. 8A and 8B, the obtained numeric of the horizontal color difference when the zoom lens 120 of the present embodiment of the invention is at the wide angle mode and the telephoto mode falls within a standar range.

Figure 9A:
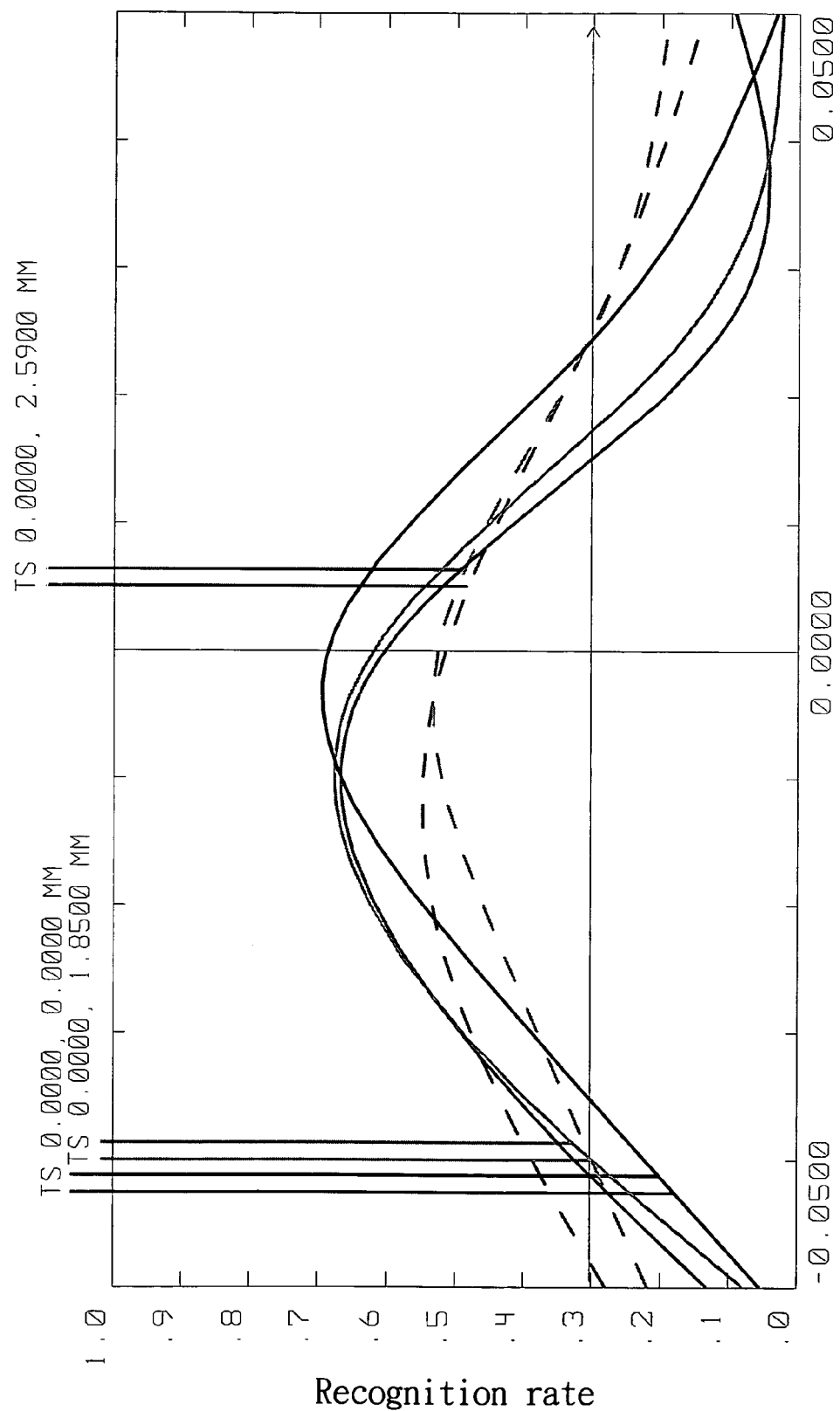
FIGS. 9A and 9B are diagrams showing the through-focus modulation transfer function when the zoom lens according to a preferred embodiment of the invention is at the wide angle mode and the telephoto mode respectively.
Figure 9B:
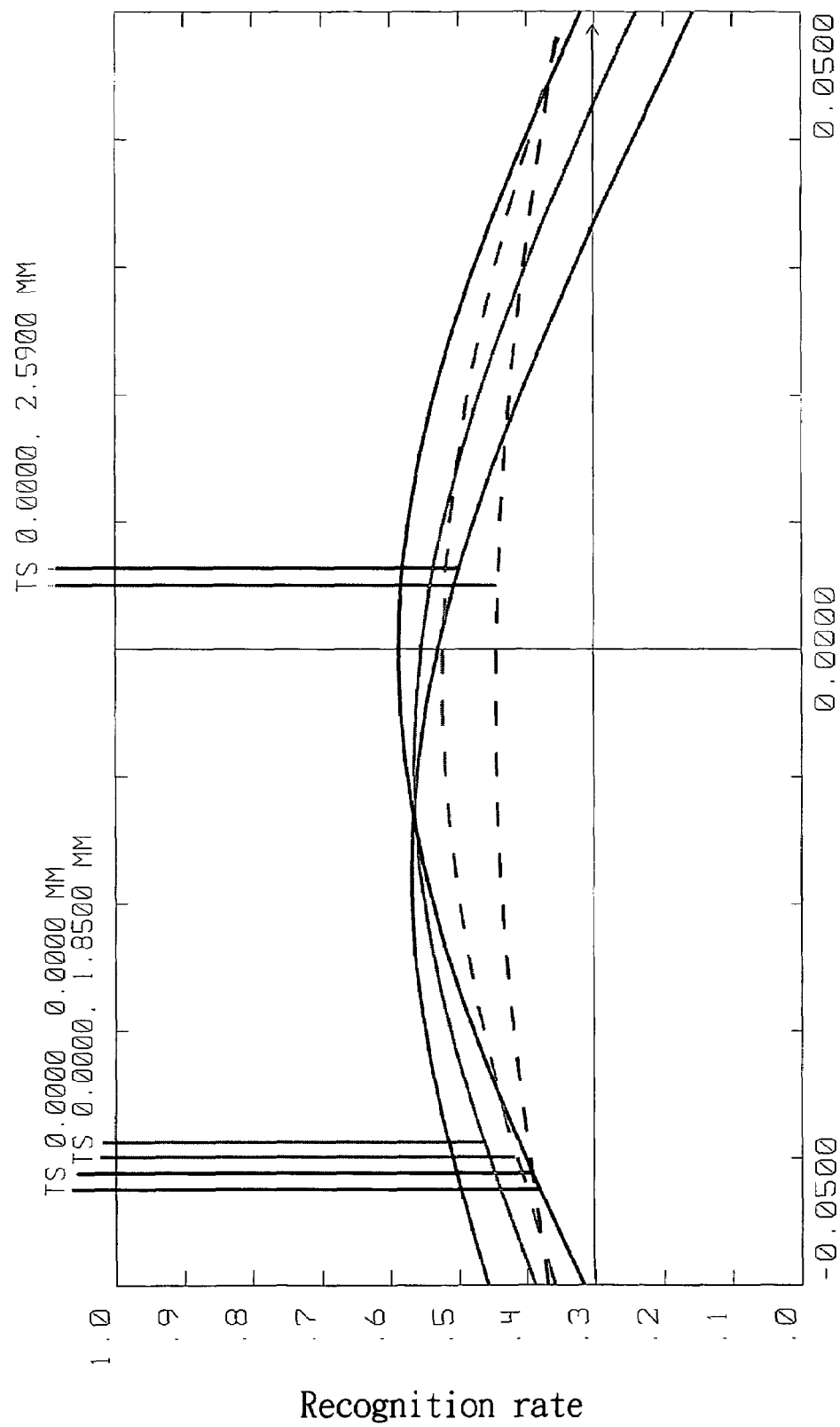

Referring to FIGS. 9A and 9B, diagrams showing the through-focus modulation transfer function when the zoom lens according to a preferred embodiment of the invention is at the wide angle mode and the telephoto mode respectively are shown. As shown in FIGS. 9A and 9B, the obtained numeric of the through-focus modulation transfer function when the zoom lens 120 of the present embodiment of the invention is at the wide angle mode and the telephoto mode falls within a standar range.

Despite the zoom lens of the present embodiment of the invention is exemplified by the second lens 123 disposed between the first lens 122 and the second lens group 125 and by the third lens 126 disposed between the first lens group 121 and the fourth lens 127, however, the dispositions of the lenses can be adjusted according to actual needs in manufacturing and application. Besides, any one who is skilled in the technology of the invention will understand that the technology of the invention is not limited thereto. For example, the second concave lens surface L2 of the first lens 122 can be used as the first concave aspheric lens surface 122a, the first lens 122 can be disposed between the second lens 123 and the second lens group 125, the fourth concave lens surface L7 of the third lens 126 can be used as the second aspheric lens surface 126a, or the third lens 126 can be disposed between the fourth lens 127 and the third lens group 128, then the dispositions of the lenses are adjusted or the characteristics of the lens surface are designed accordingly. Any designs capable of enabling the zoom lens to achieve a zoom ratio of 3 and have an appropriate back focal length by incorporating the aberration reduction effect of the aspheric lens surface and other characteristics of the lens, such as the restriction on the ratio between the effective focal lengths, so as to reduce the size and maintain the high frame quality of the acquisition apparatus, are within the scope of the technology of the invention.

The zoom lens and the image acquisition apparatus incorporating the same disclosed in the above embodiment of the invention using less than 6 lenses are capable of largely reducing the number of the lens used in the zoom lens and achieving the zoom ratio of 3 at the same time. The zoom lens of the invention has an appropriate back focal length and is capable of tightly incorporating with other elements of the image acquisition apparatus.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A zoom lens having an effective focal length fw for the wide angle mode, wherein the zoom lens, from an image side, sequentially comprises:
 a first lens group having a negative effective power and an effective focal length f1, wherein $2.1<|f1/fw|<2.6$, and the first lens group comprises:
  a first lens having a first negative power and at least a first concave aspheric lens surface; and
  a second lens having a first positive power;
 a second lens group having a first positive effective power and an effective focal length f2, wherein $1.5<|f2/fw|<1.8$, and the second lens group comprises:
  a third lens having a second positive power and at least a second aspheric lens surface; and
  a fourth lens having a third positive power; and
 a third lens group having a second positive effective power.

2. The zoom lens according to claim 1, wherein the second lens group and the third lens group have an effective focal length f23, while the third lens group has an effective focal length f3, wherein $0.3<|f1/f23|<1.6$, $0.3<|f2/f3|<0.8$.

3. The zoom lens according to claim 1, wherein the distance between the principle plane of the first lens group and the principle plane of the second lens group is d12, while the distance between the principle plane of the second lens group and the principle plane of the third lens group is d23, wherein $0.05<d12/d23<1.6$.

4. The zoom lens according to claim 1, wherein the first lens being a concavo-concave lens has a first concave lens surface and a second concave lens surface, the first concave lens surface is the first concave aspheric lens surface, and the second concave lens surface is a third aspheric lens surface.

5. The zoom lens according to claim 4, wherein the second lens has a first convex lens surface and a third concave lens surface, the first convex lens surface faces the first lens, and the third concave lens surface is positioned against the first lens.

6. The zoom lens according to claim 5, wherein the third lens being a doublet lens has a second convex lens surface, a doublet lens surface and a fourth concave lens surface, the second convex lens surface faces the third concave lens surface, the doublet lens surface is positioned between the second convex lens surface and the fourth concave lens surface, the fourth concave lens surface is positioned against the third concave lens surface, and the second convex lens surface is the second aspheric lens surface.

7. The zoom lens according to claim 6, wherein the fourth lens has a third convex lens surface and a fourth convex lens surface, the third convex lens surface faces the fourth concave lens surface, and the fourth convex lens surface is positioned against the fourth concave lens surface.

8. The zoom lens according to claim 7, wherein the third lens group comprises a fifth lens having a fourth positive power, the fifth lens is a meniscus lens and has a fifth convex lens surface and a fifth concave lens surface, the fifth convex lens surface faces the fourth convex lens surface, and the fifth concave lens surface is positioned against the fourth convex lens surface.

9. The zoom lens according to claim 8, wherein the curvature radius of the fifth convex lens surface and the curvature radius of the fifth concave lens surface are respectively equal to R1 and R2, wherein $-1.8<(R1+R2)/(R1-R2)<-0.6$.

10. The zoom lens according to claim 1, further comprising an aperture stop disposed between the first lens group and the second lens group.

11. An image acquisition apparatus, comprising:
 a sensing element; and
 a zoom lens having an effective focal length fw for the wide angle mode, wherein the zoom lens comprises:
  a first lens group having a negative effective power and an effective focal length f1, wherein $2.1<|f1/fw|<2.6$, and the first lens group comprises:
   a first lens having a first negative power and at least a first aspheric concave lens surface; and
   a second lens having a first positive power;
  a second lens group disposed between the first lens group and the sensing element having a first positive effective power and an effective focal length f2, wherein $1.5<|f2/fw|<1.8$, and the second lens group comprises:
   a third lens having a second positive power and at least a second aspheric lens surface; and
   a fourth lens having a third positive power; and
  a third lens group disposed between the second lens group and the sensing element having a second positive effective power.

12. The image acquisition apparatus according to claim 11, wherein the second lens group and the third lens group have an effective focal length f23, while the third lens group has an effective focal length f3, wherein $0.3<|f1/f23|<1.6$, $0.3<|f2/f3|<0.8$.

13. The image acquisition apparatus according to claim 11, wherein the distance between the principle plane of the first lens group and the principle plane of the second lens group is d12, while the distance between the principle plane of the second lens group and the principle plane of the third lens group is d23, wherein $0.05<d12/d23<1.6$.

14. The image acquisition apparatus according to claim 11, wherein the first lens being a concavo-concave lens has a first concave lens surface and a second concave lens surface, the first concave lens surface is the first concave aspheric lens surface, and the second concave lens surface is a third aspheric lens surface.

15. The image acquisition apparatus according to claim 14, wherein the second lens has a first convex lens surface and a third concave lens surface, the first convex lens surface faces the first lens, and the third concave lens surface is positioned against the first lens.

16. The image acquisition apparatus according to claim 15, wherein the third lens being a doublet lens has a second convex lens surface, a doublet lens surface and a fourth concave lens surface, the second convex lens surface faces the third concave lens surface, the doublet lens surface is positioned between the second convex lens surface and the fourth concave lens surface, the fourth concave lens surface is positioned against the third concave lens surface, and the second convex lens surface is the second aspheric lens surface.

17. The image acquisition apparatus according to claim 16, wherein the fourth lens has a third convex lens surface and a fourth convex lens surface, the third convex lens surface faces the fourth concave lens surface, and the fourth convex lens surface is positioned against the fourth concave lens surface.

18. The image acquisition apparatus according to claim 17, wherein the third lens group comprises a fifth lens having a fourth positive power, the fifth lens is a meniscus lens and has a fifth convex lens surface and a fifth concave lens surface, the fifth convex lens surface faces the fourth convex lens surface, and the fifth concave lens surface is positioned against the fourth convex lens surface.

19. The image acquisition apparatus according to claim 18, wherein the curvature radius of the fifth convex lens surface and the curvature radius of the fifth concave lens surface are respectively equal to R1 and R2, wherein $-1.8 < (R1+R2)/(R1-R2) < -0.6$.

20. The image acquisition apparatus according to claim 11, further comprising an aperture stop disposed between the first lens group and the second lens group.

21. The image acquisition apparatus according to claim 11, wherein the sensing element is a charge coupling device (CCD) or a complementary metal-oxide semiconductor (CMOS).

22. The image acquisition apparatus according to claim 11 being a digital still camera.

* * * * *